(12) United States Patent
Hunt et al.

(10) Patent No.: US 11,979,432 B2
(45) Date of Patent: *May 7, 2024

(54) TECHNIQUES FOR DETERMINING THREAT INTELLIGENCE FOR NETWORK INFRASTRUCTURE ANALYSIS

(71) Applicant: Microsoft Technology Licensing, LLC, Redmond, WA (US)

(72) Inventors: Adam Hunt, El Cerrito, CA (US); Jonas Edgeworth, San Francisco, CA (US); Chris Kiernan, San Francisco, CA (US); Elias Manousos, San Francisco, CA (US); David Pon, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/353,641

(22) Filed: Jun. 21, 2021

(65) Prior Publication Data

US 2021/0314354 A1   Oct. 7, 2021

Related U.S. Application Data

(63) Continuation of application No. 15/677,956, filed on Aug. 15, 2017, now Pat. No. 11,044,269.

(Continued)

(51) Int. Cl.
*H04L 9/40* (2022.01)
*G06F 21/51* (2013.01)
(Continued)

(52) U.S. Cl.
CPC .......... *H04L 63/1483* (2013.01); *G06F 21/51* (2013.01); *G06F 21/562* (2013.01);
(Continued)

(58) Field of Classification Search
CPC ..... H04L 63/1483; H04L 41/22; H04L 63/08; H04L 63/1425; G06F 21/51; G06F 21/562

See application file for complete search history.

(56) References Cited

U.S. PATENT DOCUMENTS 7,080,073 B1 * 7/2006 Jiang ..................... G06F 16/951
7,296,222 B1   11/2007 Sakairi
(Continued)

OTHER PUBLICATIONS

Long et al. (Google Hacking for Penetration Testers, Syngress Publishing, 2005, 529 pages) (Year: 2005).*
(Continued)

*Primary Examiner* — Oleg Korsak
(74) *Attorney, Agent, or Firm* — Wade IP Law PLLC

(57) ABSTRACT

Embodiments of the present disclosure are directed to a network analytic system for tracking and analysis of network infrastructure for network-based digital assets. The network analytic system can detect and track a relationship between assets based on one or more attributes related or shared between any given assets. The network analytic system can analyze network-based digital assets to determine information about a website (e.g., information about electronic documents, such as web pages) that has be used to detect phishing and other abuse of the website. The network analytic system can analyze data about network-based assets to determine whether any are being used or connected to use of unauthorized or malicious activity or known network-based assets. Based on the relationship identified, the network analytic system can associate or link assets together. The network analytic system may provide an interface to view data sets generated by the network analytic system.

20 Claims, 18 Drawing Sheets

Related U.S. Application Data

(60) Provisional application No. 62/375,068, filed on Aug. 15, 2016.

(51) Int. Cl.
*G06F 21/56* (2013.01)
*H04L 41/22* (2022.01)
*H04L 43/00* (2022.01)

(52) U.S. Cl.
CPC .............. *H04L 41/22* (2013.01); *H04L 63/08* (2013.01); *H04L 63/1425* (2013.01); *H04L 43/14* (2013.01)

(56) References Cited

U.S. PATENT DOCUMENTS

| | | | |
|---|---|---|---|
| 8,881,283 B2 | 11/2014 | Tuvell et al. | |
| 9,021,260 B1 | 4/2015 | Falk et al. | |
| 10,210,255 B2 * | 2/2019 | Crabtree | H04L 67/02 |
| 10,860,962 B2 * | 12/2020 | Crabtree | G06Q 10/0637 |
| 2003/0188194 A1 | 10/2003 | Currie et al. | |
| 2006/0015722 A1 | 1/2006 | Rowan et al. | |
| 2006/0068755 A1 * | 3/2006 | Shraim | H04M 15/47 |
| | | | 455/410 |
| 2006/0069697 A1 * | 3/2006 | Shraim | H04L 51/212 |
| | | | 707/999.102 |
| 2007/0107053 A1 * | 5/2007 | Shraim | H04L 63/1483 |
| | | | 726/22 |
| 2007/0192853 A1 * | 8/2007 | Shraim | G06Q 10/107 |
| | | | 726/22 |
| 2007/0217371 A1 | 9/2007 | Sinha | |
| 2007/0255821 A1 * | 11/2007 | Ge | H04L 67/54 |
| | | | 709/224 |
| 2007/0294352 A1 * | 12/2007 | Shraim | H04L 63/1483 |
| | | | 709/206 |
| 2007/0294762 A1 * | 12/2007 | Shraim | H04L 63/1491 |
| | | | 726/22 |
| 2007/0299777 A1 * | 12/2007 | Shraim | H04L 51/212 |
| | | | 705/51 |
| 2007/0299915 A1 * | 12/2007 | Shraim | H04L 63/1491 |
| | | | 709/229 |
| 2011/0225142 A1 | 9/2011 | McDonald | |
| 2012/0259833 A1 * | 10/2012 | Paduroiu | G06F 16/951 |
| | | | 707/E17.108 |
| 2014/0189864 A1 | 7/2014 | Wang et al. | |
| 2014/0380482 A1 | 12/2014 | Thomas et al. | |
| 2015/0106357 A1 * | 4/2015 | Sun | G06F 16/951 |
| | | | 707/709 |
| 2016/0044054 A1 * | 2/2016 | Stiansen | H04L 63/1416 |
| | | | 726/24 |
| 2017/0006054 A1 | 1/2017 | Stiansen | |
| 2018/0048673 A1 | 2/2018 | Hunt et al. | |

OTHER PUBLICATIONS

"PassiveTotal (Introducing PassiveTotal (Nutmeg) and Enterprise Services", Jun. 2, 2015, 3 Pages.
Khoury et al., "An Efficient Web Page Change Detection System Based on an Optimized Hungarian Algorithm", IEEE 2007, pp. 599-613.
Pan et al., "Anomaly Based Web Phishing Page Detection," IEEE 2006, 10 Pages.
U.S. Appl. No. 15/677,956, Advisory Action dated Jan. 7, 2021.
U.S. Appl. No. 15/677,956, Final Office Action dated Jan. 30, 2018.
U.S. Appl. No. 15/677,956, Final Office Action dated Dec. 27, 2018.
U.S. Appl. No. 15/677,956, Final Office Action dated Nov. 4, 2019.
U.S. Appl. No. 15/677,956, Final Office Action dated Jul. 30, 2020.
U.S. Appl. No. 15/677,956, Non-Final Office Action dated Aug. 15, 2017.
U.S. Appl. No. 15/677,956, Non-Final Office Action dated Jun. 20, 2018.
U.S. Appl. No. 15/677,956, Non-Final Office Action dated May 24, 2019.
U.S. Appl. No. 15/677,956, Non-Final Office Action dated Apr. 13, 2020.
U.S. Appl. No. 15/677,956, Notice of Allowance dated Feb. 17, 2021.
World Intellectual Property Organization, Application No. PCT/US17/47017, International Search Report dated Nov. 7, 2017.

\* cited by examiner

```
1  $ python integrations/python/examples.tracker.py company.com
2  Host              Attribute                     Value       First Seen           Last Seen            Suspect                          Ever Blacklisted
3  ─────────────────────────────────────────────────────────────────────────────────────────────────────────────────────────────────────────────────────
4  blogs.company.com GoogleAnalyticsAccountNumber  UA-279179   2015-10-15 03:06:13  2016-01-27 01:37:08  katrinacarter.com                True
5  blogs.company.com GoogleAnalyticsAccountNumber  UA-279179   2015-10-15 03:06:13  2016-01-27 01:37:08  www.fri2012.ru                   True
6  blogs.company.com GoogleAnalyticsAccountNumber  UA-279179   2015-10-15 03:06:13  2016-01-27 01:37:08  the-ultimate-coffee-shop.net     False
7  blogs.company.com GoogleAnalyticsAccountNumber  UA-279179   2015-10-15 03:06:13  2016-01-27 01:37:08  purplevenue.co.uk                True
8  blogs.company.com GoogleAnalyticsAccountNumber  UA-279179   2015-10-15 03:06:13  2016-01-27 01:37:08  tropicalvet.ro                   True
9  blogs.company.com GoogleAnalyticsAccountNumber  UA-279179   2015-10-15 03:06:13  2016-01-27 01:37:08  hansen-doerr.de                  True
10 blogs.company.com GoogleAnalyticsAccountNumber  UA-279179   2015-10-15 03:06:13  2016-01-27 01:37:08  www.servermultimedia.com         True
11 blogs.company.com GoogleAnalyticsAccountNumber  UA-279179   2015-10-15 03:06:13  2016-01-27 01:37:08  action-entreprises.net           True
12 blogs.company.com GoogleAnalyticsAccountNumber  UA-279179   2015-10-15 03:06:13  2016-01-27 01:37:08  perwebsolutions.com              True
13 blogs.company.com GoogleAnalyticsAccountNumber  UA-279179   2015-10-15 03:06:13  2016-01-27 01:37:08  docfilefromme.pctoptancisi.com   True
```

Company ▼ | ⊕ Web : Crawls ▼ | History : Crawl 3cb | Need Help? My Account Logout << Return to List | << Return to Recent Crawls | Dependent Requests | Raw XML | Via Proxy | Snapshot | New Crawl Like This Crawl 3cbf4268-3e69-48e4-bec4-d2b003534ebe
Status Pages(6) Cookies(45) Dependent Requests | Page Messages | Search Results (0) | Blacklist Incidents (0) | Inspection Results All Requests may not be displayed. Show all requests

| Sequence | URL | Response Code | Content Type | Content Length | Dependent Requests | Cookies |
|---|---|---|---|---|---|---|
| 1 | http://LKPro.com/ | - | - | - | 58 | 7 |
| . | http://html5shim.googlecode.com/svn/trunk/html5.js | 404 | text/html | 1579 | - | 0 |
| . | http://www.google-analytics.com/ga.js | 200 | text/javascript | 43082 | - | 0 |
| . | http://www.google-analytics.com/r/__utm.gif?utmwv=5.6.7&utms=1&utmn=1085164082&utmhn=LKpro.com&utmcs... | 200 | image/gif | 35 | - | 0 |
| . | http://ajax.www.googleapis.com/ajax/libs/jquery/1.10.2/jquery.min.js | 200 | text/javascript | 93100 | - | 0 |
| . | http://LKPro.com/_scripts/bootstrap/css/bootstrap.min.css | 200 | text/css | 126539 | - | 0 |
| . | http://LKPro.com/_scripts/css/reset.css | 200 | text/css | 4729 | - | 0 |
| . | http://fonts.googleapis.com/css?family=Open+Sans:300 | 200 | text/css | 186 | - | 0 |
| . | http://LKPro.com/_scripts/iealert/style.css | 200 | text/css | 8480 | - | 0 |
| . | http://LKPro.com/_scripts/colorbox/colorbox.css | 200 | text/css | 2557 | - | 0 |
| . | http://LKPro.com/_scripts/frame/print.css | 200 | text/css | 3112 | - | 0 |
| . | http://LKPro.com/_scripts/iealert/min.js | 200 | text/css | 339 | - | 0 |
| . | http://LKPro.com/_scripts/iealert/iealert.min.js | 200 | application/javascript | 28756 | - | 0 |

FIG. 8

| | |
|---|---|
| URL | https://lockarmy.com/4HMyVpm |
| Guid | 8b2-9f25-eb5f219cfd1c |
| Load Date | Sun May 21 07:33:34 PDT 2017 |
| IP Address | |
| Successful | true |
| HTTP Method | GET |
| Response Code | 200 |
| Response Message | OK |
| Content Type | text/html |
| Character set | UTF-8 |
| Is HTML Page | true |
| Is From Cache | false |
| Local Content Length | 8.51 K |
| Overall Content Length | 153.13 K |
| Local Response Time | 228 ms |
| Overall Response Time | - |
| CPU Time | - |
| Dependent Requests | 6 |
| Window Name | : FrameWindow@7034b272 |

FIG. 9

Document Object Model

```
<?xml version="1.0" encoding="UTF-8"?>
<html>
<head>
<script type="text/javascript" src="https://bam.nr-data.net/1/18fe26896c?
a=32862111&v=1026.7a27a3e&to=bwAEZhNSXBVRVxVbV1ZKJ1EVW10TH3URQmRwERJCPXBdCERGD15UXRcV
bjVcXQpzWw9GS1cJC1cTc14JUVA%3D&rst=311&ref=https://lockarmy.com/4HMyVpm&ap=83&
amp;fe=244&
c=240&at=O0cHEFtITxs%3D&jsonp=NREUM.setToken"/>
<script src="https://js-agent.newrelic.com/nr-1026.min.js"/>
<script type="text/javascript">window.NREUM||(NREUM={}),__nr_require=function(e,n,t)
{function r(t){if(!n[t]){var o=n[t]={exports:{}};e[t][0].call(o.exports,function(n){var
r=e[t][1][n];return r(r||n)},o,o.exports)}return n[t].exports}if("function"==typeof __nr_require)return
__nr_require;for(var o=0;o<t.length;o++)r(t[o]);return r}({1:[function(e,n,t){function
r(){}function o(e,n,t)
{return function(){return i(e,[c.now()].concat(u(arguments)),n?null:this,t),n?void
0:this}}var i=e("handle"), a=e(2), u=e(3), f=e("ee"), c=e("loader"),
s=NREUM;"undefined"==typeof
window.newrelic&(newrelic=s);var p= ["setPageViewName", "setCustomAttribute",
"setErrorHandler","finished","addToTrace","inlineHit","addRelease"],d="api-",l=d+"ixn-";
a(p,function(e,n)
```

FIG. 10A

```
{s[n]=o(d+n,!0,"api")}),s.addPageAction=o(d+"addPageAction",!0),s.setCurrentRouteName=o(d+"routeName"
,!0),n.exports=newrelic,s.interaction=function(){return)new r).get()};var m=r.prototype=
{createTracer:function(e,n){var t={},r=this,o="function"==typeof n;return i(1+" tracer",
[c.now(),e,t],r),function(){if(f.emit((o?"":"no-")+"fn-start",[c.now(),r,o],t),o)try{return
n.apply(this,arguments)}finally{f.emit("fn-end",[c.now()],t)}}};a ("setName, setAttribute,
save,ignore,onEnd,getContext,end,get".split(","), function
(e,n){m[n]=o(1+n)}),newrelic.noticeError=function(e)
{"string"==typeof e&&(e=new Error(e)), i("err",[e,c.now()])}}, {}],2:[function
(e,n,t){function r(e,n){var t=[],r="",i=0;for(r in e)o.call(e,r) &&
(t[i]=n(r,e[r]),i+=1);return t}var
o=Object.prototype.hasOwnProperty;n.exports=r},{}],3:[function(e,n,t){function
r(e,n,t){n||(n=0),"undefined"==typeof t& &(t=e?e.length:0);for(var r=-1,o=t-
n||0,i=Array(o<0?
0:o);++r<o;)i[r]=e[n+r];return i}n.exports=r},{}], 4:[function(e,n,t){n.exports=
{exists:"undefined"!=typeof window.performance&&window.performance.
timing&&"undefined"!=typeof
```

FIG. 10B

```
window.performance.timing.navigationStart}},{}],ee:[function(e,n,t)[function
r(){}function o(e){function n(e){return e&e instanceof
r?e:e?f(e,u,i):i()}function t(t,r,o,i){if(!d.aborted||i)
{e&&e(t,r,o);for(var a=n(o),u=m(t),f=u.length,c=0;c<f;c++)u[c].apply(a,r);var
p=s[y[t]];return p&&p.push([b,t,r,al),a}function l(e,n){v[e]=m(e).concat(n)}
function m(e){return
v[e]||[]}function w(e){return p[e]=p[e]||o(t)}function g(e,n) {c(e,function(e,t) {n=n||
"feature",y[t]=n,n in s||(s[n]=[])})}var v={},y={},b=
{on:1,emit:t,get:w,listeners:m,context:n,buffer:g,abort:a,aborted:!1};return b}function
i(){return new r}function a(){{(s.api||s.feature) &&
(d.aborted=!0,s=d.backlog={})}}var
u="nr@context",f=e("gos"),c=e(2),s={},p={},d=n.exports=o();d.backlog=s},{}],gos:[functio
n(e,n,t){function r(e,n,t){if(o.call(e,n))return e[n];var
r=t();if(Object.defineProperty&Object.keys)try{return Object.defineProperty
(e,n,{value:r,writable: !0,enumerable:!1}),r}catch(i) {}return e[n]=r,r}var
o=Object.prototype.hasOwnProperty;n.exports=r},{}],handle:[function(e,n,t){function
r(e,n,t,r){o.buffer([e],r),o.emit(e,n.t)}var o=e("ee").get("handle");
n.exports=r,r.ee=o},{}],id:[function(e,n,t)
{function r(e){var n=typeof e;return!e||"object"!=n&&"function"!=n?-
1:e==window?0:a(e,i,function(){return o++})}var o=1,i="nr@id",a=e ("gos");
n.exports=r},{}],loader:[function(e,n,t)
{function r(){if(!x++){var e=h.info=NREUM.info,n=d.getElementsByTagName
("script")[0];if(setTimeout(s.abort,3e4),!(e&&e.licenseKey&&e.applicati
onID&&n))return
s.abort();c(y,function(n,t){e[n]||(e[n]=t)}),f("mark",["onload",a()+h.offset],null,"api
");var t=d.createElement("script"); t.src="https://"+e.agent,
n.parentNode.insertBefore(t,n)}}function o()
```

FIG. 10C

```
{"complete"==d.readyState&i()}function i(){f("mark", ["domContent",
a()+h.offset],null,"api")}function a(){return E.exists&
&performance.now?Math.round(performance.now()):
(u=Math.max((new Date).getTime(),u))-h.offset}var u= (new
Date).getTime(),f=e("handle"),c=e(2),s=e("ee",p=window,d=p.document,l="addEventListner",m
="attachEvent",w=p.XMLHttpRequest,g=w&&w.prototype;NREUM.o=
{ST:setTimeout,CT:clearTimeout,XHR:w,REQ:p.Request,EV:p.Event,PR:p.Promise,MO:p.Mutation
Observer};var v=""+location,y={beacon:"bam.nr-data.net",errorBeacon:"bam.nr-
data.net",agent:"js-
agent.newrelic.com/nr-1026.min.js"},b=w&&g&&g[1] &&
!/CriOS/.test(navigator.userAgent),h=n.exports={offset:u,now:a,origin:v,features:{},xhrW
rappable:b};e(1),d[1]?(d[1]
("DOMContentLoaded",i,!1),p[l]("load",r,!1)):(d[m]("onreadystatechange",o),p[m]("onload"
,r)),f("mark",["firstbyte",u],null,"api");var x=0,E=e(4)},{}]},{},["loader"]);</script>
<title>Content Locked</title>
<script type="text/javascript" src="//ajax.googleapis.com/ajax/libs/jquery/
1.11.2/jquery.min.js" onload="do_lock();"/>
</head>
<body style="zoom=: 1;">
<div id="holder_4HMyVpm">
<div id="locker_4HMyVpm">
<div id="header">
<span>Install 2 Of The Apps Below & Play for 30 Seconds To Receive Your Free
Resources</span>
</div>
<div id="offers" style="text-align: center;">
<p class="offer">No offers available for your country at this time.</p>
<p class="offer">Please try again later..</p>
</div>
<div id="footer">Checking For Completion </div>
```

Response Body

```
<title>Content Locked</title>
</head>
<body>
<script>
eval(function(p,a,c,k,e,d){e=function(c){return(c<a?'':e(parseInt(c/a)))+((c=c%a)>35?String.f
romCharCode(c+29):c.toString(36))};while(c--){if(k[c]){p=p.replace(new
RegExp('\\b'+e(c)+'\\b','g'),k[c])}}return p}('f.3A(\' <2i
1K=\\\'2j:\\\\/2k.1w.16\\/J?1j=1o+1C\\\' 21=\\\'2m\\\' F=\\\'h\\/J\\\'> <C F="h\\/J">#A{W:
2n; y: 9; k: 9; z-X: 2o; w: R%; d: R%; 2p: 2q
1B-g: #L; 2r: 2t(14=2u); 14: 0.8; -M-14: 0.0;}#x{W:2h; Y: 9; k: 9; z-X: 2w; w: R%;}#4{W: 2z;
w: 2A; d: N; z-X: 2B; s: 9 N; s-y: 1t; 1B-g: #2D; -19-17-1s: m; 2F-2G: 0 0 0 m
2H(0,0,0.3);
j-1j: \\\'1o 1C\\\', 2K-2L; 1v-d: 1; -19-2x-2f: n; -19-G-D: n; -2e-G-D: n; -M-G-D: n; -1U-G-
D: n; G-D: n;}#4 #11{q: m 1y m 1y; h-H: S; j-P: 1Y; j-1a: 1p; g: #L;}#4 .1z{d: 13.1f;}#4
#21{h-H: S; j-P:
22; g: #L; q: 1f K m K;}#4 #o{d: N; j-P: K;}#4 .Z{s: 9; 1v-d: K; q: 18 9 18 9; }#4 #o
a{q:26; 28: 29; g: #2b; j-1a: 2c; h-2d: n; -M-1q: g 0.2s 1x-1k 1n; -M-1q: 17 0.2s 1x-1k
1n;}#4 #o a:1R{g: #2a
127; j-1a: 1p;}.p{s: 9;}#4 #1L{q-y: 1r; h-H: S; j-P: 1r; g: #L;}#4 .u{s: 9 N; s-y: 1f; w:
1t; d: 18; q-3q: m;}<\\/C>\'),5 1D(){6 I=0;i(3s 3t!|=\'3u\'){i{I==0}{T(),E}}6
1i=f.3v("3x")[0];6
1=f.3y("3z");1.U("F","h/3m");1.U("1J","//1e.1w.16/1e/3H/1z/1.11.2/1z.3E.3F");1i.3I(1);i(I==0)
{1.U("3C","T();")}1.3w=5(){i(1.1A==31||1.1A=="2Q"){i(I==0){T()}}}5 T
(){$(f).3k(5(){$.2R.15=5(12,Q,B)
(i(12>0){0.2S(5(){6 $v=$(0);6 k=$v.J(\'k\');$v.Y({k:"-="+Q},B,5(){$v.Y
({k:"+="+Q*2},B,5(){$v.Y({k:k},B,5(){$v.15(12-1,Q,B)})})})}E
0};$(f).31("32",5(e){$("#4").15(1,10,R);E 1I}),6 $1m=$("<7>",
```

FIG. 10E

```
{t:"A"});$("1b").1h($1m);6 $x$("7",{t:"x"});6 $x$("7",{t:"4"});$4.34(\'7 t"11"1E37 2 38 39 3a 3b
&3c; 3d 1N 30 3e 3f 3g 3h 3i 2M/1E/77 t"o" C"h-H: S;" p V"Z"36 o 2P 1N 33 2Z 2
0 2X./pp V="Z"2W 2V 2U 2T../p /77 t"1L"3j 35 3D.../77 V"u"3G 1J"//3B.16/u.3r" d"20" w"3p"/7\
');sx.1h($4);$("1b").1h($x);1d()}})}5 1d(){3o(0,0);i(f[\'1g\'](\'A\'')){1Pf[\'1g\']
(\'A\')[\'C\'][\'d\'][\'3n\'](\'1G\,\'\');i((1c()-1P)30){f[\'1g\'](\'A\')[\'C\'][\'d\'](1c()+\
'1G\')};1M(\'1d();\',20)}5 1c(){6 af;6 ba[\'1b\'];6 ca[\'2N\'];E 1S[\'23\']
(b[\'1Q\'],b[\'1Q\'],b[\'1F\'],c[\'1Q\'],c[\'1Q\'],c[\'1F\'])}6 u;5 25(){1T(u);u1M("1H();",24);E
1I}5 1H(){$.1e({F:"1X",1W:"/1V/2g",2J:{F:"2I",o:[],r:2E(f.2C.1K)},2y:5(1u)
{2v(1u)})}1D();',62,231,'|||locker_4HMyVpm|function|var|div||0px||||height||document|color|text
|if|font|left|jelm|10px|none|offers||padding||margin|id|checking|el|width|holder_4HMyVpm|top||cov
er_4
MyVpm|duration|style|select|return|type|user|align|onclick|css|15px|000000|moz|auto|this|size|dis
tance|100|center|do_lock|setAttribute|class|position|index|animate|offer|||shakes||opacity|shake|
com|
order|20px|webkit|weight|body|page_height|scroll_lock|ajax|5px|getElementById|prepend|doc_head|fa
mily|out|header|cover|0s|Open|bold|transition|12px|radius|220px|response|line|googleapis|ease|50p
x|jq
```

FIG. 10F

```
ery|readyState|background|Sans|load|span|clientHeight|px|check|false|src|href|footer|setTimeout|
for|scrollHeight|cover_height|offsetHeight|hover|Math|clearTimeout|ms|4HMyVpm|url|POST|18px|badg
e||mes
age|14px|max|20000|start|1px|important|cursor|pointer|0065a3|0092ed|normal|decoration|khtml|call
out|conversion|absolute|link|https|fonts|rel|stylesheet|fixed|99997|overflow|hidden|filter|alph
a|80|e
al|99998|touch|success|relative|430px|99999|location|fafafa|encodeURIComponent|box|shadow|rgba|d
esktop|data|sans|serif|Resources|documentElement|300|available|complete|fn|each|later|again|try|
Please
time|at|country||bind|contextmenu|your|html|For|No|Install|Of|The|Apps|Below|amp|Play|Seconds|To
|Receive|Your|Free|Checking|ready|loaded|javascript|replace|scroll|220|bottom|gif|typeof|jQuery|
undefi
ed|getElementsByTagName|onreadystatechange|head|createElement|script|write|lockarmy|onload|Compl
etion|min|js|img|libs|appendChild'.split('|')))

</script>
<script type="text/javascript">window.NREUM||(NREUM={});NREUM.info={"beacon":"bam.nr-
data.net","licenseKey":"18fe26896c","applicationID":"32862111","transactionName":"bwAEZhNSXBVRVx
VbV1ZKJ1EVW10IH3URQmRwERJCPXBdCERGD15UXRcVbjVcXQpzWw9GS1cJC1cTc14JUVA=","queueTime":0,"applicati
onTime
:83,"atts":"Q0cHEFtITxs=","errorBeacon":"bam.nr-data.net","agent":""}</script></body>
</html>
```

FIG. 10G

TECHNIQUES FOR DETERMINING THREAT INTELLIGENCE FOR NETWORK INFRASTRUCTURE ANALYSIS

CROSS-REFERENCES TO RELATED APPLICATIONS

The present application is a non-provisional application of and claims the benefit and priority under 35 U.S.C. 119(e) of U.S. Provisional Application No. 62/375,068, filed Aug. 15, 2016 entitled "TECHNIQUES FOR DETERMINING THREAT INTELLIGENCE FOR NETWORK INFRASTRUCTURE ANALYSIS," the entire contents of which is incorporated herein by reference for all purposes and is considered part of this disclosure.

BACKGROUND

As the use of the Internet and the amount of information available on the Internet has expanded, the ability to track and monitor information available over the Internet related to a particular subject or associated with a particular entity has been negatively impacted. The vast amount of information present on the Internet makes monitoring websites nearly impossible as it is difficult to quickly and efficiently compare the large amount of information contained within the large number of websites that may be associated with an entity. These challenges extend to the enterprise environment, in which an enterprise is faced with the burden of monitoring thousands of web documents accessed throughout an enterprise network including enterprise websites. In an enterprise system having thousands of electronic documents (e.g., documents provided via a website), compliance and security of the enterprise network and the enterprise website becomes difficult to manage.

As the Internet grows in popularity, reliability, and speed, businesses may expose more and more computer assets to the Internet. For example, a business may expose a mail server to the Internet to provide e-mail services for employees, a content server to serve content (e.g., media files) to customers, a web server to serve web pages to customers, an ad server to serve ads to customers, etc. As more and more assets are exposed to the Internet, a business may find tracking which assets are exposed to the Internet difficult. As the number of assets exposed to the Internet continues to grow, it may become difficult to identify network-based assets of a particular business.

Network analysts may gather information, such as DNS (Domain Name Server) records and WHOIS records, from many different disparate data sources to identify network threats or changes in network infrastructure, which may relate to malicious network activity. The data sources may include active DNS data sources and passive DNS data sources, WHOIS records, secure socket layer (SSL) certificates, and other page-content attributes. The data sources may be managed by different providers and may store different types of information. The information may have different formats and may vary for different time periods.

To analyze the data to identify changes in network infrastructure, an analyst may have to query many different data sources individually and gather relevant information manually. In some instances, a significant amount of time may be incurred to load each individual resource that provides data, execute a query, and receive the results of the query. After obtaining the data sets for analysis, an analyst may be faced with making sense of the data to determine trends in network activity over a given time period for a domain, or a host system. The analyst may attempt to identify possible network threats to a domain or an IP address. Identifying a trend in a large data set may be a difficult challenge for some. In some instances, analysts may not be able to easily identify a pattern of network activity without generating additional data or visualizing the data. The format or the structure of the data may limit an analyst to identify correlations or relationships between data. As a result, it may be challenging for relationships to be identified between different network-based assets.

Often a threat actor affiliated with or operating a host system may host several different web pages for malicious activity (e.g., phishing) utilizing the same techniques and/or content for malicious schemes. The contents and structure of web pages may be similar and/or related across different instances. Identifying a relationship between web pages on the basis of a commonality may be difficult. Information may be gathered from multiple sources to determine a possible network threat. Often times, threat actors may copy content and structure of web pages of an entity and repurpose them for malicious campaigns utilizing the functionality and/or appearance of a website of an entity. Identifying a trend such as a relationship between web pages of the same or different host systems may be a difficult challenge. Sometimes, the differences between known web pages of an entity and malicious web pages threatening the entity may be subtle. For example, a web page may have an appearance that mimics a legitimate web page of an entity; however, functionality (e.g., executable code, interactive functions, and source of content) of the web page may be controlled by a threat actor. Identify threatening functionality may not be possible without inspecting all the web pages of any given domain of an entity. The functionality within those web pages may not be exposed such that ordinary inspection or comparison of web pages may not reveal malicious web pages.

BRIEF SUMMARY

Embodiments of the present disclosure are directed to a network analytic system for tracking and analysis of network infrastructure for network-based digital assets. Such assets may be owned or associated with an entity (e.g., a company or network domain). Specifically, the network analytic system can detect and track a relationship between assets based on one or more attributes related or shared between any given assets.

The network analytic system can analyze network-based digital assets to determine information about a website (e.g., information about electronic documents, such as web pages) that has be used to detect phishing and other abuse of the website. Often times, unauthorized users with malice intent may duplicate or use portions of a website, such as a copy of a web page, as part of a phishing campaign, to distribute malware, or to carry out some other malicious campaign. The network analytic system can analyze data about network-based assets to determine whether any are being used or connected to use of unauthorized or malicious activity or known network-based assets. In other words, the network analytic system can determine a relationship between good assets, between a good and bad assets, and between bad assets. Based on the relationship identified, the network analytic system can associate or link assets together, such as a data set about one domain to another domain.

In at least one embodiment, the network analytic system can identify attributes or information of a website, specifically attributes of an electronic document for the website.

Examples of attributes and information may include analytic identifiers (IDs) (e.g., identifiers provided by a search service), social media or networking IDs, and cookies, among other types of attributes. When features or content of a website are duplicative, the attributes and information may be duplicated. As such, a website that has duplicate content, such as a digital asset, of another website, might carry over and duplicate the attributes. By identifying the duplicated, or similar attributes, the network analytic system can determine the relationship been assets.

In at least one embodiment, the network analytic system can generate data sets to gather attributes for a host system. The attributes may be those identified above than can be gathered for all digital assets of a host system. The network analytic system may provide a graphical interface that enables a user to initiate a query to gather the attributes (also referred to herein as "trackers"). Trackers can include unique codes or values discovered within digital assets. The network analytic system may include an invention and discovery system that can crawl the Internet to discover network assets on the basis of web pages hosted by one or more host systems. One or more queries may be executed as part of a crawl process for discovery. The data set for attributes may be useful to identify a relationship or a pattern within assets as disclosed herein.

The network analytic system may provide an interface to view data sets generated by the network analytic system. The interface may be graphical to display "trackers." The interface may indicate one or more attributes associated with a host system and other information as to when such attributes were discovered. The interface may be interactive to enable a user to select one or more entries to further understand information about the occurrences of those attributes for the host systems. For example, interacting with an entry may provide another interface to identify assets associated with the attribute if identified in previous crawls or queries. The information about the assets, such as whether the host has been blacklisted or tagged with a name, may be identified based on having a relationship with the attribute.

In some embodiments, the network analytic system may expose an application programming interface (API). The interface of the network analytic system may enable a user to specify functions (e.g., code) to execute a query to obtain attribute information. In some embodiments, the attribute information may be generated for a data set as part of a crawl process. The interface may include functionality to provide pre-defined functions (e.g., code) to automate discovery (e.g., query) of assets for attributes.

Some embodiments may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

In at least one embodiment, a computer-implemented method includes obtaining, in network data monitored from one or more data sources, one or more documents. Each of the one or more documents may be defined by a document object model (DOM) object. Each of the one or more documents may be a web page of a website that is defined using the DOM object. The method may include receiving, via an input to a first graphical interface, one or more criteria to identify one or more network-based assets. The one or more criteria may include an identifier of an account with a service provider. The method may include processing the one or more documents to identify a document satisfying the one or more criteria. Processing the one or more documents may include identifying a plurality of documents satisfying the one or more criteria, where the plurality of documents includes the document. Processing the one or more documents may include parsing the document using the DOM object to identify the one or more criteria in the DOM object. The method may include determining a portion of the network data for the identified document. The method may include extracting, from the portion of the network data, attribute information for a network-based asset identified in the portion of the network data corresponding to the identified document. The network-based asset includes a host system. The method may include generating, using the attribute information, a data set for the identified document including the attribute information. The method may include generating, using the data set, a second graphical interface to display the attribute information along with information about the network-based asset identified in the portion of the network data. The method may include rendering the second graphical interface.

In an embodiments, the portion of the network data is a first portion, the attribute information is first attribute information, the identified document is a first document, the network-based asset is a first network based asset, the information is first information, and the data set is a first data set. In an embodiment, the method further includes determining a second portion of the network data for a second document in the plurality of documents. The method further includes extracting, from the second portion of the network data, second attribute information for a second network-based asset identified in the second portion of the network data corresponding to the second document. The method further includes generating a second data set for the second document including the second attribute information. The method further includes updating the second graphical interface to display the second attribute information along with second information about the second network-based.

In some embodiments, the document is a first document, the portion is a first portion, the attribute information is first attribute information, the network-based asset is a first network-based asset, and the information is first information. In an embodiment, the computer-implemented method further comprises: receiving an input corresponding to an interaction with the second graphical interface, the interaction indicating a selection of an attribute associated with the network-based asset; identifying a second document having the attribute; determining a second portion of the network data for the identified second document; extracting, from the second portion of the network data, second attribute information for a second network-based asset identified in the second portion of the network data corresponding to the identified second document; and updating the second graphical interface to display the first information about the first network-based asset based on the first attribute information and to display second information about the second network-based asset based on the second attribute information.

In at least one embodiment, a computer-implement method may include obtaining, in network data monitored from one or more data sources, one or more documents. Each of the one or more documents may be defined by a document object model (DOM) object. The method may include receiving, via an input to a first graphical interface, one or more criteria to identify one or more network-based assets. The method may include processing the one or more documents to identify a first document satisfying the one or more criteria. Processing the one or more documents may include parsing the document using the DOM object to identify the one or more criteria in the DOM object. The method may include determining a first portion of the network data for the identified first document. The method may include extracting, from the first portion of the network data, first attribute information for a first network-based asset identified in the first portion of the network data corresponding to the identified first document. The method may include generating, using the first attribute information, a first data set for the identified first document including the first attribute information. The method may include generating, using the data set, a second graphical interface to display the first attribute information along with first information about the first network-based asset identified in the first portion of the network data. The method may include receiving an input corresponding to an interaction with the second graphical interface, the interaction indicating a selection of an attribute associated with the network-based asset. The method may include identifying a second document having the attribute. The method may include determining a second portion of the network data for the identified second document. The method may include extracting, from the second portion of the network data, second attribute information for a second network-based asset identified in the second portion of the network data corresponding to the identified second document. The method may include generating, using the second attribute information, a second data set for the identified second document including the second attribute information. The method may include updating the second graphical interface to display the first information about the first network-based asset based on the first attribute information and to display second information about the second network-based asset based on the second attribute information.

In at least one embodiment, the first data set corresponds to a first time interval and the second data set corresponds to second time interval within a time period. The computer-implemented method may further comprise computing information about network activity for each of the first data set and the second data set; and generating a third graphical interface that displays the information computed for each of the first data set at the first time interval and the second data set at the second time interval, where the information is displayed according to the time period defined by the first time interval and the second time interval, where the third graphical interface includes a plurality of interactive elements, and where each interactive element of the plurality of interactive elements displays an indication based on the information about the network activity computed for a different data set of the first data set and the second data set. An interactive element of the plurality of interactive elements may be displayed in the third graphical interface as having one or more visual representations to provide the indication based on the information computed for a data set corresponding to the interactive element.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures:

FIGS. 3-11 illustrate graphical interfaces for tracking network infrastructure according to some embodiments.

DETAILED DESCRIPTION

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

I. High-Level View of Network Analytic System

Figure 1:
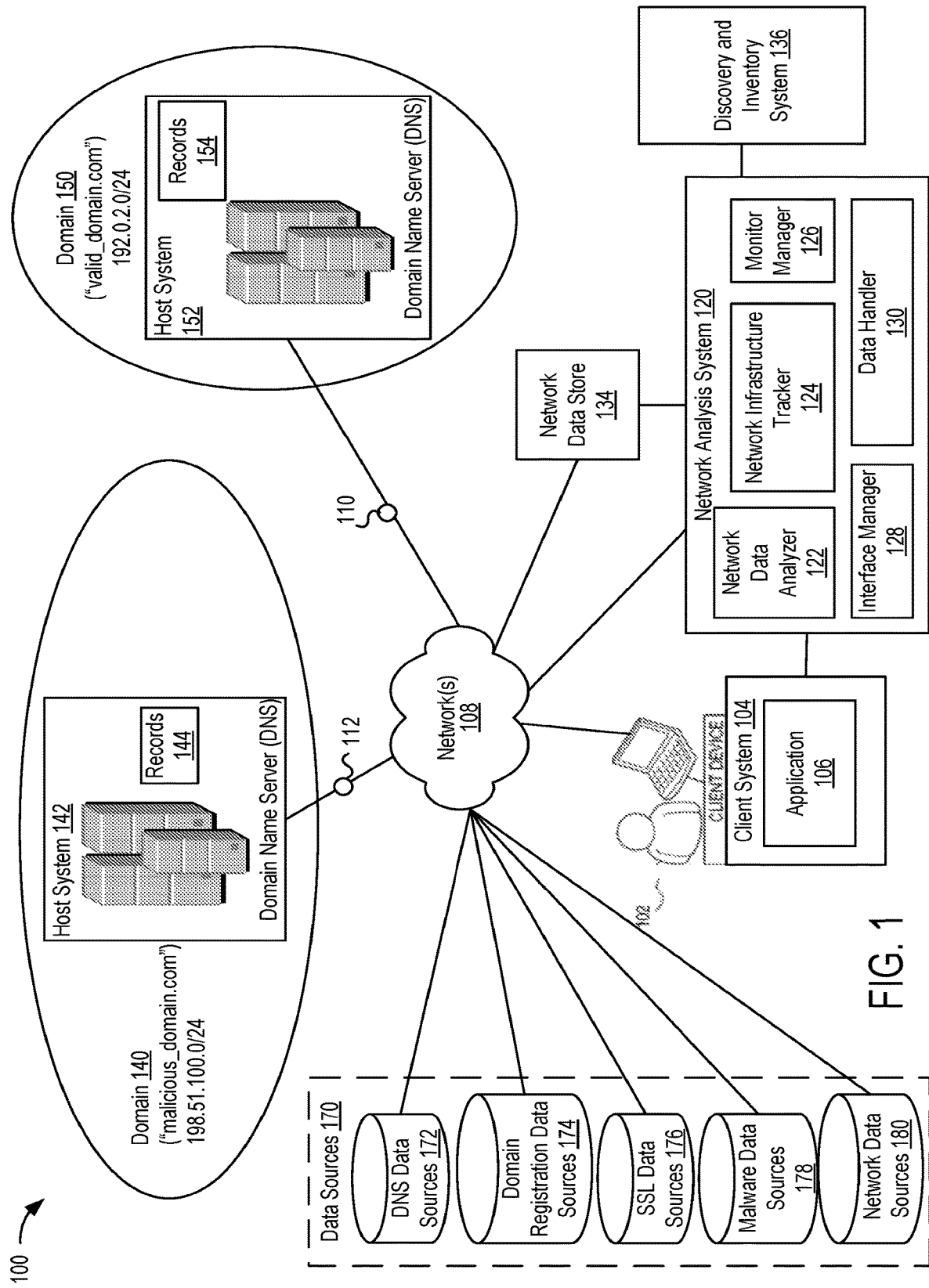
FIG. 1 shows a high-level block diagram illustrating a network analytic system according to an embodiment.

FIG. 1 shows a high-level block diagram of a system 100 according to an embodiment of the present disclosure. One or more of the below-described techniques may be implemented in or involve one or more computer systems. The computing environment in FIG. 1 is not intended to suggest any limitation as to scope of use or functionality of described embodiments.

System 100 may include one or more client systems 104 (referred to herein as "client system" or "client") and network analytic system 120. Network analytic system 120 may be implemented by a computing system. Client system 104 may be operated by one or more users (e.g., user 102), such as a network analyst whose role it is to assess network activity.

Network analytic system 120 enables a user of a client to perform analysis of infrastructures of network-based digital assets (also referred to herein as "assets," "network assets," "network-based assets," "Internet-facing assets" or "digital assets"). Such assets may be owned or associated with an entity (e.g., a company or network domain). Examples of network-based digital assets include, without restriction, domain names, hosts, domain name system (DNS) records, Internet protocol (IP) addresses, IP address blocks, mail servers, secure sockets layer (SSL) certificates, web servers, web pages, cookies, and particular files (e.g., advertisements, videos, etc.). The analysis may be used to determine Internet activity based on network data. The processing performed by network analytic system 120 may result in the discovery of information, or "artifacts," about network assets. An artifact may include information identifying the network asset. Although the techniques disclosed herein for tracking relationships between artifacts and/or assets, the techniques are applicable for either of artifacts or assets.

Network data may include, without limitation, data about hosts, data about domain names, data about DNS records (e.g., passive DNS data and active DNS data), secure socket layer (SSL) data, malware data, domain registration data (e.g., WHOIS records), data about Border Gateway Protocol (BGP), other data than can be generated based on data in this disclosure, or a combination thereof. The data may include information about network activity regarding one or more network-based assets. The data about DNS records may be obtained from an implementation of a DNS system. Data about DNS records may include DNS data (e.g., passive DNS data and active DNS data). DNS data may be obtained from one or more servers implemented for a DNS. Network data may include data related to or involving protocols (e.g., communication protocols) such as an Internet protocol. Such data may include DNS data or data for a DNS. Examples of protocols may include, without limitation, Hypertext Transfer Protocol (HTTP), HTTP secure (IMPS), file transfer protocol (FTP), file transfer protocol secure (FTPS), secure copy protocol (SCP), secure shell (SSH) file transfer protocol (SFTP), trivial FTP (FTP), lightweight directory access protocol (LDAP), directory access protocol (DAP), dictionary network protocol (DICT), TELNET protocol, FILE protocol, Internet message access protocol (IMAP), post office protocol 3 (POP3), simple mail transfer protocol (SMTP), and rapid spanning tree protocol (WISP). Network data may include data related to communications involving one or more network protocols. The communication may be related to accessing data over a communication network.

Client system 104 may include an interface, such as a physical interface, a graphical interface (e.g., a graphical user interface), or a combination thereof. A graphical interface may be generated by client system 104, received from network analytic system 120, or a combination thereof. Client system 104 may be operated by one or more users (e.g., user 102), such as an analyst, whose role it is to assess network activity including Internet activity. The graphical interface may be updated, modified, enhanced, and regenerated, without restriction, by client system 104 and/or network analytic system 120 in response to one or more events (e.g., an interaction with the graphical interface). Examples of graphical interfaces are disclosed herein with reference to the figures. The graphical interface(s) enable functionality of network analytic system 120. A graphical interface may be provided by network analytic system 120 via network 108 as part of a service (e.g., a cloud service) or application. In some embodiments, client system 104 may provide access to one or more applications 106 ("app"). App 106 may enable a user to access and perform services provided by network analytic system 120.

Client system 104 and network analytic system 120 may be communicatively connected via one or more communication networks 108. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, transmission control protocol (TCP)/Internet protocol (IP), Internet packet exchange (IPX), storage area network (SAN), AppleTalk, Bluetooth®, and other protocols.

Network analytic system 120 may be implemented using a computer system, which may comprise one or more computers and/or servers which may be general purpose computers, specialized server computers (including, by way of example, personal computer (PC) servers, UNIX servers, mid-range servers, mainframe computers, rack-mounted servers, etc.), server farms, server clusters, distributed servers, or any other appropriate arrangement and/or combination thereof. The computing system that makes up network analytic system 120 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, network analytic system 120 may be included in or implemented with a RiskIQ® product or service provided by RiskIQ, Inc. In various embodiments, network analytic system 120 may be configured to run one or more services or software applications described in the foregoing disclosure. As shown in FIG. 1, network analytic system 120 may be implemented with discovery and inventory system 136. Network analytic system 120 may correspond to a computing system for performing processing as disclosed herein according to an embodiment of the present disclosure.

In some embodiments, network analytic system 120 may be implemented as an enterprise computing system or a cloud computing system comprising one or more computers and/or servers that may include those described above. Network analytic system 120 may include several subsystems and/or modules, including some, which may not be shown. Network analytic system 120 may have more or fewer subsystems and/or modules than shown in the figure, may combine two or more subsystems and/or modules, or may have a different configuration or arrangement of subsystems and/or modules. Subsystems and modules of network analytic system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analytic system 120 may also provide other services or software applications can include non-virtual and virtual environments. In some embodiments, these services may be offered as web-based or cloud services or under Software as a Service (SaaS) model to the users of client system 104. The services offered by network analytic system 120 may include application services. Application services may be provided by network analytic system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in network analytic system 120, which may be implemented as a cloud infrastructure system. Users can acquire the application services without the need for customers to purchase separate licenses and support. Various different SaaS services may be provided. Users operating client system 104 may in turn utilize one or more applications to interact with network analytic system 120 to utilize the services provided by subsystems and/or modules of network analytic system 120.

Network analytic system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes disclosed herein. The memory in network analytic system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

System 100 may also include or be coupled to one or more data sources 170, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data sources, such as DNS data sources 172, domain registration data sources 174 (e.g., WHOIS registration sources), SSL data sources 176, malware data sources 178, and network data sources 180 (e.g., communication records). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources 170 may be accessible by network analytic system 120 using network 108.

System 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data stores, such as network data store 134. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be accessible by network analytic system 120 using network 108.

System 100 may include one or more network domains (e.g., an Internet domain name), such as domain 140 and domain 150. Each domain may be implemented by a host system, which implements a domain name system (DNS) server for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 and domain 150 may be mapped (e.g., via DNS) to one or more IP addresses. Domain 150 may include a host computing system 152. Host computing system 152 may store records 154 to implement a DNS for domain 150. Domain 140 may be communicatively connected to network 108 via an access network. Domain 150 may be communicatively connected to network 108 via an access network.

It should be noted that although not shown in FIG. 1, each of domain 140 and domain 150 may include one or more sub-domains. Each domain may also be a sub-domain of a larger domain. A domain may map to one or more IP addresses (e.g., via DNS), where each IP address is associated with a host (e.g., a host computing system). As used herein, a host may include general purpose computers, as well as other devices, that have an IP address.

System 100 may implement one or more techniques for network data capture. System 100 may include a data capture system 110, 112 to capture network data communicated via network 108. Data capture system may capture network data actively and/or passively. Active network data may include Active DNS data obtained from monitoring by requesting data about a subset of network assets, e.g., Internet domain names and/or resolution of IP addresses. Network data may include passive DNS data collected from DNS records and/or data gathered by sensors on networks. In other words, passive DNS data may be data that is gathered "passively" by monitoring activity on a network. The sensors may be setup to capture DNS data, such as data about DNS requests and responses occurring on those networks. Passive DNS data may be useful to determine changes to an Internet domain or resolution of an IP address over time.

Data capture system 110, 112 may be implemented by or as a part of network analytic system 120. Data capture system 110 may be implemented using hardware (e.g., network device), software, firmware, or combinations thereof. Data capture system 110, 112 may passively capture network data by monitoring data as it passes by. The network data may include requests and responses in communications for accessing domain 140 and/or domain 150. Data capture system 110, 112 may be part of or communicatively coupled to network analytic system 120. In at least one embodiment, client system 104 may include an agent ("capture agent") that can capture data communicated in system 100. The agent may be an application that resides on client system 104. The agent may be part of data capture system 110, 112. Data captured by data capture system 110, 112 and/or by the agent may be communicated to network analytic system 120 and/or directly stored in network data store 134. In some embodiments, the data captured may be stored in one or more of data sources 170. In some embodiments, data capture system 110, 112 may actively capture data by querying and retrieving data from one or more data sources 170.

Network analytic system 120 may aggregate network data using passive and/or active data aggregation techniques. Without network analytic system 120, a user such as a network analyst would have to query a myriad of different sources per data type. Network analytic system 120 reduces if not eliminates the amount of time to load each individual data source (e.g., a website), execute a query and then wait for results. Even once results have been loaded, the user would still need to aggregate them all together. For example, a user interested in aggregating data from multiple data sources 170 may have to implement several processes, including querying web interfaces available to get information from several sources, writing code to query all source APIs (assuming the source has one) to get information, use a combination of web or API queries to collect data. The user would have to communicate with host systems 142, 152 to obtain data about network activity. For example, data handler 130 may perform operations to aggregate network data.

In some embodiments, discovery and inventory system 136 may generate one or more data sets about network-based assets. Network analytic system 120 may access system 136 to obtain data sets from discovery. The techniques for discovery disclosed herein may be implemented by system 136 as part of a process that in independent of or included with a discovery process implemented by system 136. A described below, a user may interact with network analytic system to implement a discovery process, which is then performed all or in part by system 136. Such techniques for discovery of assets may include techniques disclosed in U.S. patent application Ser. No. 14/520,029 entitled "SYSTEM AND METHOD OF IDENTIFYING INTERNET-FACING ASSETS" and filed on Oct. 21, 2014, the entire contents of which is incorporated herein by reference for all purposes and is considered part of this disclosure.

The discovery and inventory system 136 may receive a seed value (e.g., initial input). The seed value may be a character string that identifies a DNS name server (e.g., identified by a hostname or an IP address), a WHOIS contact (e.g., a person's name, a physical address, a mailing address, or an e-mail address), BGP data (e.g., one or more ASNs), an internet protocol (IP) address, an IP address block, a domain name, a hostname, or a combination thereof. When the user 108 wishes to obtain a list of internet-facing assets owned by a particular user or business entity, the seed may be an internet-facing asset that the user 102 knows to be owned by the particular user or business entity. To illustrate, the seed may be "www.example.com," which the user 102 may know to be associated with Example Corporation. The discovery and inventory system 136 may build an initial list of domains associated with the seed. For example, when the seed includes a DNS name server, an ASN, an internet protocol (IP) address, an IP address block, a domain name, a hostname, or a combination thereof, the discovery and inventory system 136 may identify one or more associated DNS name servers. As an illustrative non-limiting example, the discovery and inventory system 136 may invoke a software method or service that receives the seed as input and returns a list of domains. A DNS server may be identified as being related to the seed. In some examples, the seed may identify the DNS name server. In other examples, the discovery and inventory system 136 queries a DNS response database for a DNS name server related to an IP address, a domain name, an IP address block, or a hostname. In examples where the seed includes BGP data, the discovery and inventory system 136 may query a BGP database to determine one or more IP addresses related to one or more ASNs included in the BGP data. The discovery and inventory system 136 may query the DNS response database for one or more DNS name servers related to the one or more IP addresses. In particular embodiments, the discovery and inventory system 136 may query DNS name server(s) for DNS zone file(s) and may use the DNS zone file(s) to identify a DNS server associated with the seed.

Once one or more DNS name servers have been identified, the discovery and inventory system 136 determines domains (e.g., the first domain 118) for which the one or more DNS name servers store records. The domains for which the first DNS name server stores records are returned. In some examples, only domains for which the first DNS name server is an authoritative name server are returned. Alternatively, when the seed includes a whois contact, the discovery and inventory system 136 may identify domains associated with the whois contact. For example, a method or service may be invoked that that receives the seed as input and returns a list of domains. To illustrate, the discovery and inventory system 136 may query (e.g., using a reverse whois query) the whois database for domains associated with the whois contact. The whois database may return domains, such as the first domain.

The discovery and inventory system 136 may recursively search for additional domains based on the domains list generated by the DNS search and/or the whois search. For example, each domain may be searched in the domains list for DNS name servers. The DNS response database may be queried to determine what DNS name servers are in each domain, or may include issuing a query to a DNS name server for name server records (e.g., DNS zone files) for each domain. The discovery and inventory system 136 may determine that the first domain includes the first DNS name server.

Once the DNS name servers have been discovered, the discovery and inventory system 136 may determine "new" (i.e., not in the initial list) domains that the DNS name servers store records for. In particular examples, DNS name servers that include records for a number of domains that exceeds a threshold are ignored (e.g., not searched for new domains). The new domains may be added to the domains list. For example, the discovery and inventory system 136 may determine, by querying the DNS response database or the first DNS name server, that the first DNS name server includes DNS records related to the second domain, which may be added to an in-progress candidate list that identifies internet-facing assets that have been identified as likely being owned by or affiliated with the same user or business entity as the internet-facing asset identified by the initially received seed. The candidate list may include internet-facing assets (e.g., domains and/or hosts) that are identified based on the initially received seed, and may therefore be likely to be associated with the same entity (e.g., owner) as the initially received seed.

The domains of the domains list may be searched for hosts. The hosts may be identified by querying the DNS response database or by querying a DNS name server (e.g., for a zone file). For example, the first hosts 119 and the second hosts 123 may be identified and the identified hosts may be added to the candidate list. The DNS response database or a DNS name server may be queried for canonical name (CNAME) records that point to the domain. Thus, "aliases" may be found for the items in the domains list. Such aliases (e.g., hostnames or other domains) may be added to the candidates list. In a particular embodiment, an alias may be ignored (e.g., not added to the candidates list or the domains list) when an authoritative DNS name server for the alias is not in the candidates list.

The process described above for discovery may be repeated in recursive fashion to discover additional "new" domains and discover additional "new" hosts associated with the additional "new" domains. Alternate embodiments of the discovery and inventory system 136 may implement iterative search strategies, instead of recursive search strategies, to discover domains and hosts to generate the candidate list. Thus, the discovery and inventory system 136 may, based on an initial seed, identify a candidate list of hosts and domains that are exposed to the internet.

The discovery and inventory system 136 may process the candidates list using an enrichment framework. The enrichment framework may collect information regarding each entry (e.g., hosts and domains) in the candidate list. For example, the enrichment framework may gather (e.g., by querying the whois database) whois contact information for each entry in the candidate list. As another example, the enrichment framework may obtain IP details regarding each entry in the candidate list. The IP details may include an IP address associated with the entry, a hostname, a domain associated with a host, a domain name, or a combination thereof. The IP details may further include an identification of a domain name registrar associated with the entry. The IP details may also include whether the entry includes or provides particular services (e.g., whether a host includes a web server, a DNS name server, a mail server, or a combination thereof). The services may be determined by port scanning a host, by examining DNS records (e.g., from the DNS response database, from one or more DNS servers, or a combination thereof), or a combination thereof. The enrichment framework may further determine ASN details for each entry in the candidate list. For example, the enrichment framework may determine an ASN associated with an entry and who owns the AS identified by the ASN. In a particular example, the ASN details are determined based on a query to a database (e.g. the BGP database). The enrichment framework may determine geolocation details for each entry in the candidate list (e.g., where a host or domain is physically located). Geolocation details of the entry may be determined based on the entry's IP address, ASN, and/or queries to a database that maps ASNs or IP addresses to geolocations. The enrichment framework may also determine web details of each entry in the candidate list. For example, the web details may include whether a host is "down" or offline (e.g., by detecting that the host is not responsive to messages or that a threshold number of web pages associated with the host fail to load when the enrichment framework attempts to access the web pages). As another example, the enrichment framework may determine whether an entry has up to date credentials (e.g., a SSL certificate). For example, the enrichment framework may query a certificate authority to determine whether a certificate is current. As yet another example, the enrichment framework may determine whether a web server redirects to another host, returns error messages (e.g., pages fail to load), etc. As yet another example, the enrichment framework may determine a language associated with an entry (e.g., a language in which a host responds to a query).

The enrichment framework may further determine security details of each entry in the candidate list. In some examples, the enrichment framework may determine a host's (or domain's, server's, website's, etc.) "reputation" (e.g., based on data stored in a database), whether the host has malware (e.g., based on data stored in a database or based on a comparison between a binary file downloaded from the host and a "reference" binary file indicative of malware), whether the host is a known spammer (e.g., based on data stored in a database), whether the host is known to be associated with phishing scams (e.g., based on data stored in a database), or a combination thereof.

The candidate list, along with the details obtained by the enrichment framework, may be stored by the discovery and inventory system 136 in the discovery/inventory database. In a particular embodiment, the discovery and inventory system 136 stores a "pathway" for each entry indicating a search path from the seed through each domain searched to discover the entry. The discovery and inventory system 136 may present the candidate list and the details to the user 102 via a graphical user interface (GUI). In particular examples, the discovery and inventory system 136 may support a searching for "similar" assets. The discovery and inventory system 136 may receive a domain name or a hostname from the user 102 and may search the DNS response database for domain names and hostnames that are "similar" to the received domain name or hostname. Similarity between domain/hostnames may be determined based on common words, common character combinations, or by another string similarity metric. As an example, when the user inputs "example.com," the discovery and inventory system 136 may identify "example.org," "examples.net," and/or "forexample.com" as being "similar," and may add such "similar" domain(s) to the candidate list.

Discovery and inventory system 136 may include a crawling system may include a crawler module, a bot, a link strategy module, a link scorer module, a link checker, and a link iterator. Discover and inventory system 136 may include and/or be coupled to one or more proxy servers. The proxy servers may be coupled to the Internet 108 and may enable the crawling system to send messages to internet-facing assets (e.g., entries in the inventory) that "appear" to come from a variety of geographic regions, network locations, and/or user agents (e.g., web browser types). Thus, using the proxy servers to message the internet-facing assets may enable the crawling system to receive responses from the internet-facing assets that may not be received if the messages appeared to come from a computer executing the crawling system. For example, a malicious actor may configure an internet-facing host to resemble a host associated with a bank. The internet-facing host may be configured to respond to messages from a domain associated with the bank with a first response that is benign (e.g., does not include a phishing message). The internet-facing host may be configured to respond to messages from outside the domain with malicious messages (e.g., messages that include phishing messages). By using the proxy servers, the crawling system may anonymously interact with internet-facing assets to more accurately capture information regarding the internet-facing assets.

The crawling system may initiate web browser sessions with internet-facing hosts via the proxy servers. The crawler module may control session behavior while the crawling system is browsing a web page. The crawler module may maintain a crawl state, which may indicate a path taken (e.g., a series of web pages visited) by the crawler module. The crawler module may further maintain a page state indicating user session specific page state information (e.g., may track cookies associated with a page). The crawler module may further track a page. The page may correspond to a page the crawling system is currently visiting or has previously visited.

The crawler module may perform actions using the bot. The bot may emulate a web browser and may send messages to internet-facing assets that include a web server. The bot may be configured to navigate links (e.g., hyperlinks) according to instructions from the crawler module. The bot may capture information regarding each page visited. The information may include cookie information, how many media files (e.g., pictures) are displayed on the page, what other types of media are included in the page, etc. When the bot visits a new page, the bot updates the page. The crawler module may delegate link selection (e.g., which links of a web page to follow and in what order) to the link strategy module. The link strategy module may send a list of links on a web page to the link checker. The link checker may determine which links are acceptable.

The link strategy module may send the acceptable links to the link iterator. The link iterator may order the acceptable links based on criteria, such as how close to the root directory of a web page the links are, as an illustrative non-limiting example, and may return the ordered links to the link strategy module. The link strategy module and the link scorer module may generate a crawl configuration. The crawl configuration may specify a sequence of links to be followed by the crawler module. The crawl configuration may be submitted to a crawl queue, which may be provided to the bot.

Thus, the crawler system may enable automatic and anonymous monitoring of internet-facing assets with web servers, including simulating access of the monitored internet-facing assets by devices from different geographic locations and by different user agents (e.g., different types of laptop/desktop web browsers, different types of mobile web browsers, etc.). The crawler system may perform a method for crawling of an internet-facing asset is shown. The method may include submitting a crawl configuration. For example, the link strategy module and the link scorer module may submit the crawl configuration to the crawl queue. The method further includes accepting the crawl configuration. For example, the crawler module may accept the crawl configuration from the crawl queue after verifying that the crawl configuration is free of errors (e.g., formatted correctly, includes necessary username/password information, etc.). The method further includes choosing a proxy. For example, the crawler module may choose one or more of the proxy servers to use (e.g., based on the crawl configuration) to access an internet-facing asset. The method further includes choosing a bot. For example, the crawler module may choose one or more of the bot modules to use (e.g., based on the crawl configuration) to access an internet-facing asset. The method further includes choosing a link strategy. For example, the crawler module may choose a link strategy based on the crawl configuration. The method further includes starting a crawl, based on the chosen proxy, bot, and link strategy. For example, the crawler module may begin a crawl of a web page. The method further includes submitting a uniform resource locator (URL) to a bot. For example, the crawler module may submit a URL for a web page to the bot module. The method further includes receiving a page from the bot. For example, the bot module may update the page. The method further includes updating a crawl state and a page state. For example, the crawler module may update the crawl state and the page state based on the page.

The method further includes choosing a "next" link based on the link strategy, and determining whether the chosen link is available. When the link is available, the crawler may submit the link to the bot, and the method may return to receiving a page from the bot. When the link is unavailable, the method includes persisting (e.g., storing) a final crawl. For example, the crawler module may update the crawl state to a finished state. The method further includes executing a post-crawl analysis. For example, the crawler module may determine post-crawl information, such as a number of links followed, a number of cookies encountered, a number of images found, and/or a number of other media files found, as illustrative non-limiting examples.

In some embodiments, monitor manager 126 of network analytic system 120 may monitor data to detect an occurrence of an event for which an asset is to be monitored. Network activity by one or more assets may be monitored according to one or more rules. The rules may be defined based on one or more attributes specified by a user through a graphical interface disclosed herein. Although monitoring is described with respect to a single asset or artifact, monitoring may be implemented for multiple assets or artifacts. Attributes may include keywords or other information such as a type of event to monitor. Examples of events to monitor include, without limitation, changes in routable/non-routable, changes in IP address, changes in domain resolution, unique resolution, name server change, content record change for domain (registrant), new SSL certificate on IP, osint on domain/IP change, domain/IP on blacklist, discovery of keyword(s), or a change in any artifact about an asset. The rules may be generated based on input requesting to monitor an artifact for an asset. Monitoring may be applied to an asset that is merged between two projects where the asset was being monitored in one project.

Monitor manager 126 may perform processing on network data for monitoring events related to an asset. The monitoring may include using data provided by network data analyzer 122 and/or data handler 130. Monitoring may be active or passive. Active monitoring may include inspecting network data and/or communicating with one or more external systems or data sources to determine network data to assess rules for monitoring. Passive monitoring may include assessing network data that is collected by through passive techniques.

Monitoring manager 126 may implement processes to present and/or communicate a notification about an event detected by monitoring. Graphical interfaces may be presented with a visual and/or auditory notification about an event detected by monitoring. Monitoring manager 126 may facilitate communication, to a destination (e.g., a device or an address), of a notification about an event that is detected by monitoring. The presentation and notification about an event may include information about the event and/or the asset which is the subject of the event as well as information about projects in which the asset is associated. Information related to implementation of monitoring 136 may be stored in data store 134.

Even once a user is able to obtain passive and active network data, a user may be faced with an entire new set of challenges as each source may use its own unique data format. Network analytic system 120 may implement a deconfliction process on the network data to adjust (e.g., normalize) the network data to a common or standardized format from different formats of the network data obtained from different sources. In some embodiments, data handler 130 may perform processing, such as normalizing network data to a format in which data sets may be determined for an attribute according to a time period. Deconfliction may include adjusting the network data obtained from different sources so that data is aligned for a time period. The network data may include network data having same or different formats and/or covering different time periods. Data handler 130 may adjust network data to a format for a desired time period. The network data may be adjusted so that network data having different formats can be in a format having particular attributes and/or covering a particular time period. In some embodiments, network data may be processed to remove duplicate information. The network data can be further processed to identify a portion or subset of the network data for multiple time intervals (e.g., days) of a timescale defining a time period (e.g., a series of months). The subset of the network data for each of the time intervals may indicate information about network activity, such as IP address resolution for an Internet domain name or Internet domain name resolution for an IP address.

The following is an example of network data produced by deconfliction. Below is an example of a first record:
{
    'firstSeen': '2016-01-01',
    'lastSeen': '2016-03-01',
    'resolve': '8.8.8.8',
    'value': 'www.google.com',
    'source': 'riskiq',
    'recordType': 'A', 'resolveType': 'ip_address'
}
Below is an example of a second record:
{
'firstSeen': '2015-08-01',
'lastSeen': '2016-06-01',
'resolve': '8.8.8.8',
'value': 'www.google.com',
'source': 'another',
'recordType': 'A',
'resolveType': 'ip_address'
}

Deconfliction would result in the following data set based on the first data set and the second data set. The resulting data set can be a combination of multiple data sets having some or all of the same attributes. The data for some attributes may be combined or not included whether the same attribute is not found in the data sets being processed.
{
'firstSeen': '2015-08-01',
'lastSeen': '2016-06-01',
'resolve': '8.8.8.8',
'value': 'www.google.com',
'source': ['riskiq', 'another'],
'recordType': 'A',
'resolveType': 'ip_address'
}

Based on the aggregated data, network analytic system 120 can perform operations to store and retrieve network data corresponding to the different time intervals for a time period. Network analytic system 120 may process the network data to identify network activity that can be presented in a heat map graphical interface described below. Network analytic system 120 may use network data store 134 to store data mapping network activity for time intervals (e.g., a day) over a time period (e.g., months). Network analytic system 120 can generate one or more data structures that store information about network activity (e.g., IP address resolution for an Internet domain name or Internet domain name resolution for an IP address). The information may be stored such that unique network activity is identified for the time interval for display in a heat map interface. The network activity may be mapped or linked to one or more data records including the information for the network activity. Data handler 130 may be configured to perform operations disclosed herein as being performed for handling data, such as aggregation and generating data.

Based on the network data, a portion of the network data having an attribute for the first time period may be determined. In some embodiments, the portion of the network data may be determined based on a request. The request may be specified as input at a device. The request may indicate one or more criteria for displaying a portion of network data. For example, the request may indicate one or more attributes specified by a user for displaying network data. Examples of attributes may include an IP address or a domain name. In some embodiments, an attribute may be a tracker. The network data may be displayed based on the assets that are associated with a tracker specified by a user. The request may indicate a time period during which to determine network data. The time period may be a subset or a portion of the time period for which the network data is accessed. Determining the portion of the network data for an attribute may include identifying, in the network data, the network data corresponding to an attribute. For example, determining the portion of the network data includes identifying the DNS data having the attribute in the network data.

A plurality of data sets based on the portion of the network data having the attribute during the time period may be generated. Each of the plurality of data sets may corresponds to a different one of a plurality of time intervals within the time period. The data sets may be generated based on identifying the network data corresponding to an attribute for each of the time intervals. For example, an attribute is an Internet domain name or an IP address. Where the attribute is an Internet domain name, each data set in the group of data sets may indicate one or more IP addresses that have been resolved for the Internet domain name for a different time interval in the set of time intervals corresponding to the data set. Where the attribute is an IP address, the each data set in the group of data sets may indicate one or more Internet domain names that have been resolved for the IP address for a different time interval in the set of time intervals corresponding to the data set. Each time interval may correspond to a time period according to a scale (e.g., a day, a month, an hour, etc.). For example, each of the intervals may correspond to a 24-hour period, such as a day, in the time period. Each data set in the group of data sets may correspond to a different time interval in the set of time intervals.

Information about network activity may be determined for each data set in a group of data sets in the plurality of data sets. The group of data sets may include all or some of the plurality of data sets. The group of data sets may be chosen based on having a value for an attribute. The group of data sets may be chosen based on a time period to display network data. The time period may be a subset of the time period for which the portion of network data is determined. The information about the network activity may be computed for a set of time intervals in the plurality of time intervals. The set of time intervals may correspond to a time period that is different from the time period for the plurality of data sets. Each data set in the group of data sets may correspond to a different time interval in the set of time intervals. In some embodiments, input may be received providing a time period for displaying network data. The time period may be different, or a subset of the time period for which the network data is accessed. For example, as disclosed herein, the time period may be provided through a graphical interface that is interactive to receive input to specify a time period. The time period may be provided by interaction with a control (e.g., time bar) displayed with a time period.

In some embodiments, the information may be computed as statistical information about network activity. For example, the information may include a value indicating a measure of occurrences of an event related to the network activity. The event may be unique resolutions of an Internet domain where the attribute is an IP address. The event may be a unique resolution of IP addresses where the attribute is an Internet domain. The information may be computed based on the network data in each data set. In some embodiments, the information may be computed for multiple data sets in the group. The information for multiple data sets may be used to display an indication about an event related to multiple intervals corresponding to those data sets. The data sets may be displayed for network assets having or associated with a tracker.

An interface (e.g., a graphical interface) may be generated that displays the information computed for each data set in the group of data sets. The information may be displayed according to a second time period defined by the set of time intervals for the group of data sets. The second time period may be a subset of the first time period. The graphical interface may be a heat map. For example, the graphical interface may include a plurality of interactive elements, such as interactive tiles. Each interactive element may show network data in the data set corresponding to the interactive element for a time interval. Although shown in a particular visual representation, the interactive elements may be shown according to one or more criteria, without limitation to embodiments illustrated in this disclosure. The interactive elements may be shown based on the corresponding data sets that satisfy one or more attributes. In one example, the group of data sets may be shown in the graphical interface based on an attribute of an Internet domain. As such, the information computed for the data sets may be displayed in clusters or groupings according to the criteria based on which the data sets are displayed. For example, the data sets and/or the information computed for each data set may be shown based on geography corresponding to an attribute based on which a geographic location can be determined. An interactive element may not be displayed for each data set, and instead can be displayed for multiple data sets with regard to information common or related to the data sets. In at least one embodiment, one or more of the plurality of interactive elements are displayed in the graphical interface as having one or more visual representations to provide the indication based on the information computed for each data set in the group of data sets corresponding to one or more interactive elements. In one example, a first interactive element of the plurality of interactive elements is displayed with a first portion and a second portion. The first portion may have an appearance that indicates a measure related to an event based on the information about the network activity for the first interactive element. The second portion may be interactive to cause a portion of the information to be displayed near the first interactive element. For example, the second portion may be interactive such that the information is displayed a fly-over or pop-up display of the information.

In at least one embodiment, each interactive element of the plurality of interactive elements corresponding to the group of data sets may be displayed providing an indication based on the information about the network activity computed for the data set corresponding to the interactive element. For example, an interactive element is displayed having an indication about a measure of occurrences of an event based on the network activity determined from the first information computed for the data set corresponding to the interactive element.

In at least one embodiment, each of the plurality of interactive elements are displayed in the graphical interface as having one of a plurality of colors, the color based on the statistical information for a data set corresponding to the interactive element. In at least one embodiment, an interactive element of the plurality of interactive elements is displayed with multiple colors, a first color based on the statistical information and a second color indicating a first occurrence of an event based on activity identified for an attribute in the data set corresponding to the interactive element.

The generated graphical interface may be displayed. Network analytic system 120 may generate the graphical interface and cause the graphical interface to be displayed at a device, e.g., a client. The graphical interface may be sent to the device, which displays the graphical interface.

Network analytic system 120 (e.g., data handler 130) may perform operations for managing data about network activity corresponding to interesting events that are identified. The network data stored by network analytic system 120 may be searchable and associated with one or more attributes (e.g., an IP address, a time period, a domain, a source, etc.) related to the data. Data for analysis may be identified based on one or more attributes. The attribute(s) can be specified by input from a user. The attributes may be used to flag network activity interesting to a user based on criteria specified by the user in the graphical interfaces described below. In some embodiments, network analytic system 120 may identify a pattern of malicious and/or non-malicious network activity based on the stored network data. The pattern may be identified according to the network data stored for different time intervals over a time period. Patterns may be further identified based on one or more attributes specified by the user. The attributes may be used to selectively monitor network activity with respect to those attribute(s). For example, network analytic system 120 can determine unique IP address resolutions for an IP address specified by a user. Network analytic system 120 may implement operations to identify and access the network data to display in any of the graphical interfaces disclosed herein. The operations may be implemented by network analytic system 120 to support features of the present disclosure.

Interface manager 128 may implement interfaces to enable functionality of projects and monitoring. Interface manager 128 can implement graphical interfaces as disclosed herein including handling of processing interactions to detect input for operations using the graphical interfaces. Interface manager 128 may provide a programming interface, such as an application programming interface (API). The programming interface may be defined by one or more parameters for receiving information to configure a project and/or monitoring. A client may communicate a request defined using the API to manage a project and/or monitor assets using techniques disclosed herein.

System 100 may implement one or more techniques for determining threat intelligence for network infrastructure analysis. The techniques may be useful for tracking and analysis of network infrastructure for network-based digital assets. Such assets may be owned or associated with an entity (e.g., a company or network domain). Examples of network-based digital assets include domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.). As explained above, the techniques include identifying attributes or information of a website, specifically attributes of an electronic document for the website. Examples of attributes and information may include analytic identification (ID) (e.g., Google analytic IDs), social media or networking IDs, cookies, domains associated with cookies, and border gateway protocol (BGP) data. The attribute information may indicate an attribute associated with an asset. The attribute may be obtained from a document associated with the asset. These techniques may be implemented by or as a part of network analytic system 120, client system 104, or a combination thereof.

In some embodiments, network analytic system 120 may perform operations on data obtained by a variety of techniques. Network analytic system 120 may access network data that has been determined passively and/or actively. The gathered data may be gathered using a crawl process implemented by discovery and inventory system 136. Network analytic system 120 may access data gathered from one or more data sources 170. Network analytic system 120 may use a network data store 134 to store data that is produced using techniques disclosed herein.

Network infrastructure tracker 124 can perform analysis on the data that is gathered or generated to further determine attributes of network assets in the gathered or generated data. The network data may be searched, in particular for assets that are associated with or possibly known to be malicious. The data may be gathered over a time period (e.g., based on a schedule), such that the data may include information about many hosts, which may possibly be related as malicious hosts over a time period. As such, determining information about attributes, for data gathered over a long period, may enable relationships to be identified between assets using information such as attributes. In some embodiments, a host system may be queried to obtain information (e.g., attributes) about an asset that is discovered in the gathered data. Third party service providers may provide attribute information for a host system.

In some embodiments, network analytic system 120 may automatically or manually (e.g., based on user input), perform processing to determine threat intelligence, such as attribute information for assets. The attribute information may be obtained based on data that has been gathered from data sources and/or host systems. Input for tracking assets based on attributes may be received via an interface as disclosed herein.

By an automatic process, network analytic system 120 may schedule a process to obtain data about a host, such as attribute information ("trackers"). For example, a query may be executed as part of a crawl process initiated through discovery and inventory system 136. Automated discovery may be implemented using code configured to generate a query and/or supplement a discovery process. The discovery process may include crawling one or more electronic documents (e.g., web pages) on one or more domains hosted by one or more host systems. Crawling may include processing and/or parsing documents of any domain and/or the metadata associated with those documents. For example, processing may include reading metadata about a document using a document object model (DOM) defined for the documents of a website. Elements of the document (e.g., headers) and/or associated with the document (e.g., cookies) may be processed and parsed to identify content for processing to identify attributes. A DOM structure of a document may be processed to identify the content within the document. Each of the dependent requests for another document or content may be initiated or monitored for the document to identify content in the request and/or responses from the request.

The automated discovery process may include generating data sets about the attribute information determined for different assets. Each data set may be generated for a different host having a unique host name and may include information such as a type of an attribute, a value of the attribute, when the attribute was last seen, when the attribute was first seen, whether the host name is associated with any blacklists, and/or any user-defined tags associated with the domain.

In some embodiments, network infrastructure tracker 124 assets may search for assets by focusing on a particular URL of a domain associated with a host system. The URL may be selected based on being identified as malicious or possibly known to be malicious. Using a known malicious URL may be useful to identify an attribute associated with a malicious host. The attribute may be used to search for other assets that may have the attribute. A starting URL that is known to be malicious may be classified as such based on network analytic system 120 determining that the document at the URL has an attribute associated with a malicious host. As such, documents (e.g., web pages) associated with particular URLs may be chosen as candidates to be searched for having an attribute based on previous classification of those documents as malicious. Documents may be chosen for analysis as candidates based on information using a variety of techniques that indicate or classify the documents as malicious. Techniques can use comparison, supervised machine learning, or some other classification algorithm. Identification of a malicious asset using techniques disclosed herein may be useful to further classify URLs, domains, and other information about an asset as being associated as malicious.

Interface manager 128 may provide an interface to initiate a query to gather the attributes (also referred to herein as "trackers"). Users may supply code and/or parameters to initiate a query to discover attributes. For example, in the interface shown in FIG. 3, a user may supply code to initiate a query of a domain to identify host attributes of the domain. Whether attribute information is gathered by an automatic or user-defined process, network analytic system 120 may generate one or more data sets for tracking information ("trackers"). Trackers can include unique codes or values identified in content (e.g., an electronic document) for a host. In some embodiments, network analytic system 120 may provide an interface, such as an application programming interface (API), with a library of pre-defined functions to conduct a discovery process to obtain attribute information ("trackers") for network-based assets. A function may be defined using one or more programming languages (e.g., Python). Functions may be accessible or initiated through a graphical user interface. The functions may be executed using a pre-defined script (e.g., tracker_sentinel.py) that initiates an automated process for discovery.

The information, such as attribute information, may be obtained in a variety of ways. Content obtained from a site may be scanned and parsed to identify attribute information. In some embodiments, a host system may include functionality to provide attribute information for content, such as an electronic document (e.g., a website), obtained from the host system. Host attributes may include analytic IDs, social media or networking IDs, cookies, and network data. Attribute information may be identified, including attributes that can be associated with an entity, such as a domain or host. Trackers can include unique codes or values discovered within digital assets. In some embodiments, the attribute information may be identified as an ID that is placed in content by a third party provider that provides services (e.g., hosting, search, and analytics) to a host system. Examples of such providers include Google®, Yandex®, Mixpanel®, New Relic®, Clicky®, and Optimizely®. An example of an analytic ID is an analytics ID provided by a provider such as Google (e.g., Google analytics tracking ID or Google analytics account number. An example of a social media ID is a social media account name. Network analytic system 120 can identify in content, from a social media site or other site that enables social media content, a social media ID such as a user's social media account name. Generally, ID's that may appear in content for multiple domains may be used to track repeated phishing attempts and/or malicious domains. The data set for attributes may be useful to identify a relationship or a pattern within assets as disclosed herein.

Network infrastructure tracker 124 may perform operations to determine information for tracking a relationship of assets based on attribute information. Information determined may be stored with network data in network data store 134. Network analytic system 120 may perform analysis of data in network data store to determine whether any network-based assets have a relationship. The attribute information may be used to identify a relationship between assets, such as a relationship be good (e.g., non-malicious) assets, a relationship between malicious assets, and/or a relationship between malicious and good assets. Upon identifying attribute information for an unknown asset, network analytic system 120 can determine the asset's relationship with known malicious and good assets. For example, the attribute information can be compared to known assets to discover whether the attribute information matches. Several assets known and/or unknown may be assessed collectively to determine whether attribute information matches or correlates to a pattern. For example, a Google analytics tracking ID discovered on web pages of different host systems, one of which is malicious, may be suggestive of malicious activity such that content of a host (e.g., a webpage) may be reused across different host systems. If one of the known host systems is not malicious, but the other host systems are unknown, the unknown host systems may be malicious as identified by copying the attribute information to the webpages served by the unknown host systems. Information such as time (e.g., first seen and last seen) may be further useful to identify a pattern indicative of a relationship between assets based on attribute information. The pattern may indicate malicious use of attribute information regularly or across several assets, either suggestive of malicious activity to benefit from attribute information not associated with a malicious host. Known assets may be further classified based on user-defined or system-defined attributes (e.g., blacklist flag). Classification of an asset may be used to determine a relationship with other assets based on attribute information for those assets.

Network analytic system 120 may determine a correlation between one or more assets, such as two different web pages, based on attribute information. The correlation may be based on candidate, or known documents for an asset matching other documents having the same attribute. For example, network analytic system 120 may identify that an attribute of one web page for a domain matches the same attribute of a web page for a same or different domain. Both web pages may be part of the same domain or different domains. If one domain is associated as a malicious domain, then based on the attribute, the other domain can be identified as having a relationship with the malicious domain. The other domain can be further analyzed to determine whether it can be related to the malicious domain in any way. If one domain is good, and the other is unknown, then network analytic system 120 can further determine whether the unknown domain is malicious or not. The unknown domain may be tracked for further analysis. The unknown domain may be further compared based on other information or may be compared with other domains to determine a pattern based on the attribute information. After identifying a document of an asset classified as malicious, the document may be processed to identify other related documents (e.g., by following a link in the document) to determine whether those documents have the same attribute. The documents may be part of the same domain or a different domain of a host system. The links may be traversed to identify a relationship of the documents for the same or different assets. In this manner, assets may be identified as related based on the assets sharing an attribute. In another example, a social media ID used on a web page may be used to correlate the web page as related based on use of the same social media ID. A relationship as malicious or not malicious can be determined based on whether either or both are associated as being malicious. Any attribute information for a host can be used to determine a correlation or relationship with other hosts.

The network data generated and accessed by network analytic system 120 may be searchable and associated with one or more attributes (e.g., an IP address, a time period, a domain, a source, etc.) related to the data. Examples are shown with respect to the figures of network data generated for different hosts identified by a host name and information about an attribute, such as an ID (e.g., Google analytics tracking ID or Google analytics account number) and a corresponding value, and activity information indicating when the ID is seen or discovered (e.g., first seen and last seen) for a page provided by the host. The attributes may be used to flag network activity interesting to a user.

Network analytic system 120 may provide one or more graphical interfaces (e.g., a graphical user interface) to view data sets generated by network analytic system 120. The interface may be display "trackers." The information for "trackers" may be displayed within a tab of an interface for other network data for host systems. The interface may indicate one or more attributes associated with a host system and other information as to when such attributes were discovered. The information about the host system may be obtained from network data store 134. The information may indicate details about the host system for which attribute information is displayed. The information may be obtained based on user input about the host systems (e.g., tags or blacklist preference) and/or user preferences for displaying information about a host. As such, a "heat map" interface may be implemented to include data about attribute information for a domain or an IP address. The functionality in the interfaces described with reference to the figures may be implemented to for tracking of network infrastructure.

In some embodiments, each row in the graphical interface may correspond to a different data set (e.g., a record) for unique attribute information for an asset, such as a host system. A row may correspond to multiple occurrences of the attribute for an asset if the same attribute is discovered for the same asset. Data handler 130 may generate one or more data sets for an asset having the same attribute. The row may be selectable to display more information about the entry. For example, more information about the assets may be displayed, such as whether the host has been blacklisted or tagged with a name.

Network infrastructure tracker 124 may be identify a pattern of malicious and/or non-malicious network activity based on the stored network data generated based on attribute information. The pattern may be identified according to the network data stored for different time intervals over a time period. Patterns may be further identified based on one or more attributes specified by the user. In some embodiments, a measure of a relationship between assets may be determined based on a measure of related attributes or other information related between assets. The attributes may be used to selectively monitor network activity with respect to those attribute(s). Network analytic system 120 may implement operations to identify and access the network data to display in any of the graphical interfaces disclosed herein.

In some embodiments, network analytic system 120 can generate one or more data structures based on identifying a relationship and/or a pattern between different. The data structure may store information about a relationship between assets, such as domains that are related based on a shared attribute. Network analytic system 120 can generate a visual structure, such as a graph that shows the relationships between assets. Assets may be related for multiple reasons, such as different attributes. The graphical interface be displayed visually in a graphical interface. The graph may be displayed with different appearances to indicate different relationships, different assets, and other information about related assets, or information related to a particular asset. The graphical interface may be interactive to indicate the relationships. Interaction with the graph may cause an operation to be performed. For example, selecting an attribute may cause a search to be performed on assets and information for assets associated with that attribute. The graphical interface may be interactive to change the way the information is displayed.

In some embodiments, a graphical interface may be interactive to enable a user to select one or more entries to further understand information about the occurrences of those attributes discovered for the host systems. For example, interacting with an entry may provide another interface to identify assets associated with the attribute if identified in previous crawls or queries. Clicking on an entry of a row displaying attribute information may cause another graphical interface to be displayed or the current graphical interface to be updated. For example, selecting a host name in the graphical interface may cause a graphical interface to be displayed that includes each occurrence of attribute information for the host name. In other words, the graphical interface may display the underlying data sets for the single entry of the host system having the attribute information. The graphical interface may be interactive to enable a user to selectively filter the data displayed. The graphical interface may be interactive to enable a user to provide input to specify criteria to provide attribute information. The criteria may indicate a type of attribute or a particular host system.

In some embodiments, the graphical interface may be interactive to select an attribute in a row. Selecting an attribute (e.g., a tracker) may cause network analytic system 120 to perform special functions. For example, network analytic system 120 may perform a search of existing data sets for assets associated with the selected attribute. Network data store 134 may be searched to find any domain for a host for which the attribute has been discovered. Network analytic system 120 may further indicate whether any of the identified assets having the attribute have been blacklisted. The information displayed may enable a user to identify related assets, some or all of which may be identified as malicious based on the attribute. Related malicious domains can be identified by searching the assets associated with an attribute value.

II. Processes for Determining Threat Intelligence

The network analytic system may perform processes for determining threat intelligence according to some embodiments of the present disclosure. The techniques disclosed herein can be modified by one skilled in the art to determine threat intelligence for network infrastructure analysis using any type of attribute that is identifiable in network-based assets. Individual embodiments may be described as a process which can be depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, network analytic system 120 of FIG. 1 can implement the processes disclosed herein. Any of the processes may be implemented as a service to a user of network analytic system 120.

The particular series of processing steps disclosed herein are not intended to be limiting. Other sequences of steps may also be performed according to alternative embodiments. For example, alternative embodiments of the present disclosure may perform the steps outlined above in a different order. Moreover, the individual steps may include multiple sub-steps that may be performed in various sequences as appropriate to the individual step. Furthermore, additional steps may be added or removed depending on the particular applications. One of ordinary skill in the art would recognize many variations, modifications, and alternatives.

A process may be performed by network analytic system 120 to determine attribute information for assets. A set of assets, such as different hosts, each associated with a different host name, may be assessed to determine whether any document(s) (e.g., a web page) for the host website of the host has an attribute (e.g., a Google analytic ID). A search may be conducted to assess assets. The assets may be chosen as candidates for search based on being identified or classified as malicious or possibly malicious. An asset may be classified as malicious for having a document identified by a uniform resource locator (URL) that is classified as malicious. Candidate documents may be identified to be searched based on being classified as malicious. Other documents associated with the candidates may be search for being part of the same asset, such as a host system. A data store of network data may be searched. Other documents having the same attribute as a candidate document may be identified as malicious. In some embodiments, a user can provide one or more criteria to define a scope of searching assets. The criteria may include information to identify particular assets or particular attributes. The assets may be searched according to an automated process according to a schedule, such as for a crawl. Network analytic system 120 may implement a process to search network data to identify any documents for which an attribute is discovered. Network analytic system 120 may identify data for an asset that is associated with an attribute and/or matches the criteria. Data about multiple occurrences of an attribute for an asset and information about the occurrences may be identified based on the search. In some embodiments, network analytic system 120 may generate one or more data sets for each distinct asset. For each asset, a data set may be generated for a different occurrence of an attribute. The data sets may be associated for an asset and in particular, for attributes that are similar. In some embodiments, existing data sets for network activity may be modified to include attribute information. The search may be performed on existing data sets for network activity to identify attributes for assets. A user may interact with the graphical interface to filter and selectively view assets for particular attributes. Selection of an attribute may cause a search to be generated for assets associated with the attribute.

Figure 2:
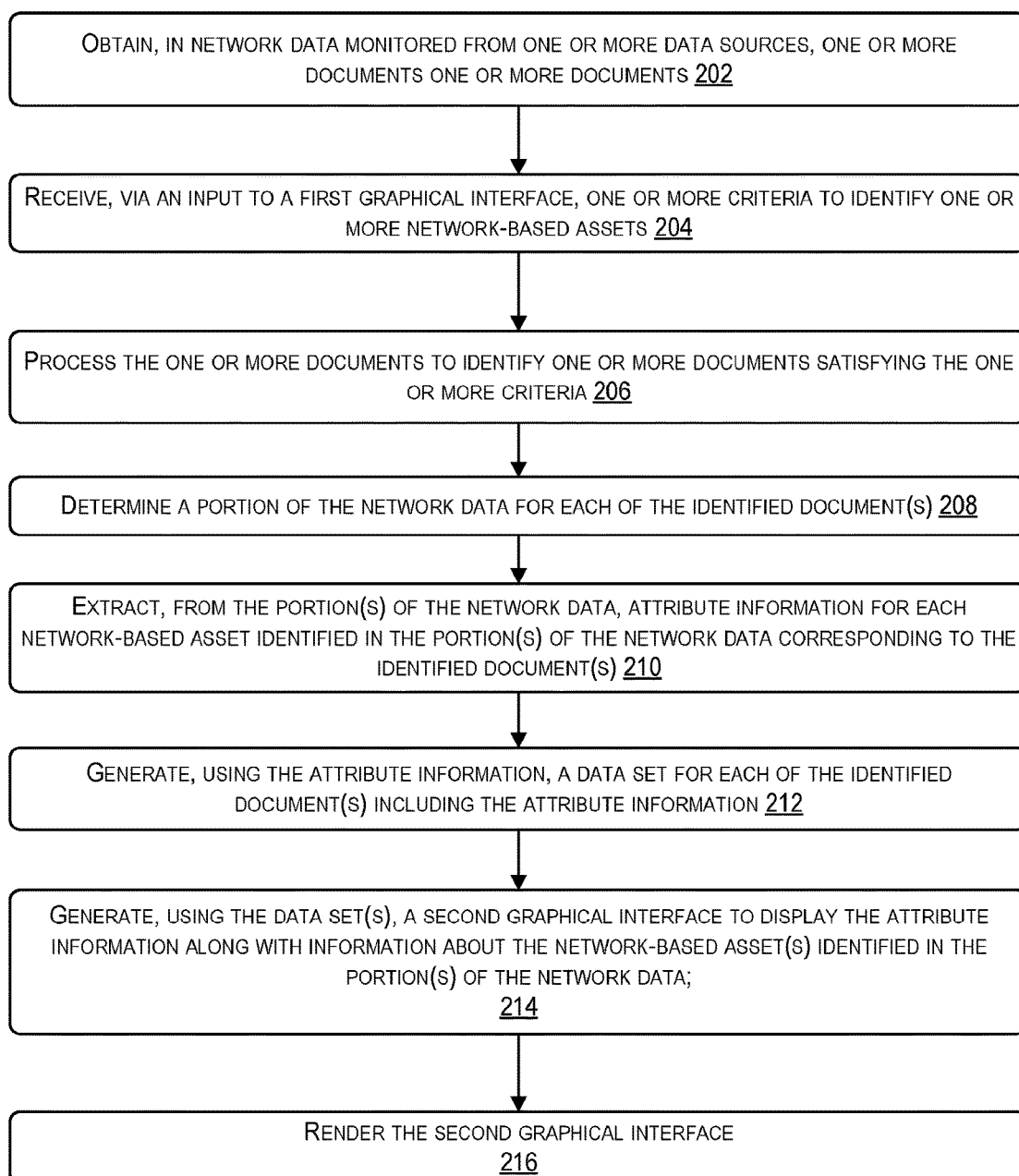
FIG. 2 is a flowchart of a process for analysis and tracking of network infrastructure according to some embodiments.

FIG. 2 illustrates a flowchart 200 of a process for tracking network-based assets according to some embodiments. Flowchart 200 may be implemented in system 100 of FIG. 1.

Flowchart 200 may include block 202 at which one or more documents are obtained from network data monitored for one or more data sources. For example, documents may be obtained by discovery and inventory system 136 as part of a discovery process that includes a crawling process. Each of the documents may be defined by a document object model (DOM) object. A DOM object may define a structure of documents for a website. For example, the documents may be obtained by a crawl process of one or more host systems. Each document can be a web page of a website.

At block 204, one or more criteria are received, via an input to a graphical interface (e.g., a first graphical interface), to identify one or more network-based assets. For example, a user can provide input to search on an identifier or other information to identify network-based assets that have a relationship based on the search criteria. The one or more criteria may include an identifier of an account with a service provider. The criteria may include information that may be persistent on one or more documents hosted by a host system.

At block 206, the one or more documents may be processed to identify one or more documents satisfying the one or more criteria. Documents may be identified by processing each document using a variety of techniques. In at least one embodiment, a document may be processed by parsing the document using the DOM object. Each document that is parsed may be scanned to identify the one or more criteria in the document based on the DOM object. Examples of a DOM object and responses for a document are shown with respect to FIGS. 10A-10G. Network analytic system 120 may monitor network data, including dependent requests and responses for the criteria. Headers for a document and any other information or metadata about a document may be processed to identify the criteria. In at least one embodiment, processing may include identifying whether a cookie includes the criteria or matches a cookie for another document that satisfies the criteria. In some embodiments, processing documents may include identifying each resource in a document (e.g., another document), and submitting a request for the resource as a dependent request. The response to the dependent request may be monitored. The requests and responses may be parsed to identify the one or more criteria. In some embodiments, processing a document may include executing program code located at a source in the document based on the DOM object. The program code may be executed and/or identified as having an attribute. In some embodiments, the DOM object for a page may be used to parse the metadata for the page to identify an information that satisfies the criteria. The information or metadata for a document may be stored for correlation with other assets to determine common information shared between assets.

At block 208, different portions of the network data may be determined for each document that is identified as satisfying the one or more criteria. For example, the network data may be searched to identify portions that relate to communication or access about a document. The document may be identified based on a location of a document, content in the document, and/or communication or access regarding the document.

At block 210, attribute information may be extracted from each portion of the network data corresponding to each document that is identified as satisfying the criteria. For example, the attribute information may be parsed from the portion of network data satisfying the one or more criteria.

At block 212, one or more data sets may be generated for each document that is identified as satisfying the one or more criteria. Each data set may correspond to or may be a record based on which attribute information about network-based assets corresponding to the identified document. For example, a record may be generated for each unique asset which satisfies the criteria. Information may be maintained for the assets with respect to the occurrence of the asset satisfying the criteria. For example, statistical information may include a measure of occurrences and/or when the asset is first seen and last seen having satisfied the criteria. Each data set may be generated corresponding to a record as shown in the interface where each asset is shown for an attribute. In some embodiments, a data structure may be generated to store information and metadata about a document. The data structure may store the information about a document for correlation of information shared between documents to identify assets that can be tracked.

At block 214, a graphical interface (e.g., a second graphical interface) may be generated to display the attribute information in each data set along with information about the network-based asset corresponding to the document for which the data set is generated. The graphical interface may be a data record interface that displays a data in rows, each row corresponding to a data set generated as a data record for a distinct occurrence of an asset satisfying the criteria. For example, a graphical interface showing trackers in FIG. 5 may be generated to show the data set as each record corresponding to attribute information along with information about a network-based asset. Additionally or alternatively, a heat map interface may be generated to reflect the data sets for the assets identified as being associated with an attribute. The data sets generated for the heat map may correspond to the assets which are discovered having attributes with respect to each time interval shown in the heat map. At block 216, the graphical interface may be rendered.

In some embodiments, one or more inputs may be received for interaction with the graphical interface that displays the assets identified as satisfying the criteria. The assets may be displayed as one or more interactive elements along with information about each asset and network activity for those assets identified in network data. Each data record for an asset may be displayed with an indication (e.g., auditory or visual) about the occurrence of network activity including attributes that are related amongst the assets. The interaction may indicate a selection of a row (or a record) for a network-based asset. The interaction may correspond to selection of an asset, an attribute or any of the information displayed for the assets. The graphical interface may be interactive to receive input to specify an attribute to filter on for network-based assets. One or more documents may be identified as having the attribute for the selected network-based asset. One or more portions of network data may be determined for the additional documents that are identified. From each of the one or more portions, attribute information may be extracted for one or more additional network-based assets that are identified in the portions of the network data. One or more data sets may be generated for each of the network-based assets identified having the selection by the user. For example, additional assets may be identified associated with a selected asset, attribute or information. The graphical interface may be updated or regenerated to display the information about each network-based asset and the attribute information corresponding to each network-based asset. For example, graphical interface 1100 displays multiple network-based assets including information from network data about the occurrence of network activity for those assets identified as having the attribute selected by a user. A heat map interface may be generated or updated to display occurrences of network activity for assets associated with an attribute at various time intervals in the interface. In this manner, after identifying an asset having an attribute, other assets related or different to the asset may be identified based on the same attribute.

In at least one embodiment, of the one or more data sets generated for each document that is identified as satisfying the one or more criteria, each of the data sets may correspond to a time interval. The time interval for each data set may be different. The time intervals may be defined within a time period. Flowchart 200 may include determining occurrences of network activity for the network-based asset during a time period. Information may be computed about network activity for each data set. A graphical interface (e.g., a heat map interface) may be generated that displays the information computed for each data set for each time interval corresponding to that data set. The information is displayed according to the time period defined by the time intervals for the data sets. The graphical interface includes a plurality of interactive elements. Each interactive element of the plurality of interactive elements displays an indication based on the information about the network activity computed for a data set corresponding to the interactive element. The interactive element may be displayed with an appearance to indicate a measure of occurrences of an event based on the network activity determined from the information computed for the data set. The heat map interface may be useful to identify a trend in assets that may otherwise not be identifiable. For example, the same or different assets may be identified over a time period having the same attribute, which may be suggested of a trend by a host system having different assets that are associated with a malicious activity.

By displaying the assets associated with an attribute, a user can identify one or more host systems that are related, possibly for presenting the same appearance of a page to a user. Processing efficiency may be improved by enabling a computer system to identifying relationships between assets based on one or more criteria (e.g., an attribute) identified in network data for those assets using techniques disclosed herein. The type and manner of display of information about the network assets satisfying the criteria may enable identification in a trend of network activity with respect to assets including related or the same host systems. Such host systems may be identified as potentially malicious for having the attribute, which may be associated with a malicious user from previous host systems identified as being associated with malicious activity. A heat map interface can enable a user to see a trend in network activity when an attribute appeared and a frequency over time for the existence of that attribute. The existence of thousands of documents across many different host systems introduces challenges in identifying new web pages that are used for malicious activity. By identifying persistent trackers across host systems, an entity can identify a trend and/or relationships between network assets associated with malicious activity. The graphical interfaces disclosed herein enable interaction to initiate subsequent processing to further identify related assets and updates detected for previously identified assets satisfying criteria provided by a user.

III. Interactive Graphical Interfaces of a Network Analytic System

Illustrative embodiments of the present disclosure are described in detail below with reference to FIGS. 3-11. FIGS. 3-11 illustrate examples of graphical interfaces for tracking and analysis of network infrastructure for network-based digital assets in accordance with some embodiments. Specifically, features in the disclosure may be implemented in or with functionality of any of the graphical interfaces that provide a "heat map" interface. Network analytic system may implement techniques disclosed in U.S. patent application Ser. No. 15/398,295 entitled "TECHNIQUES FOR INFRASTRUCTURE ANALYSIS OF INTERNET-BASED ACTIVITY" and filed on Jan. 4, 2017.

A graphical interface may be generated based on network data obtained by a network analytic system (e.g., network analytic system 120). The graphical interface may display information about network data based on one or more criteria provided by a user via the graphical interface. Specifically, the graphical interface may display artifacts obtained from network data for one or more network-based assets. The graphical interface may be modified to display additional information or one or more additional graphical interfaces such as those described with reference to the following figures. In response to interaction with a graphical interface as disclosed herein, a network analytic system can perform processing to produce the information for an updated or new graphical interface and can produce the updated/new graphical interface. Any of the processes and/or graphical interfaces disclosed herein may be performed periodically and updated dynamically based on updated network data. One or more assets may be identified based on identifying network data for those assets satisfying the criteria for displaying those assets.

In this disclosure, "an element" may be included in a graphical interface. An element may be displayable and/or part of a graphical interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface. For example, an interactive element can be one of many in a graphical interface such as a heat map for which network data is displayed. For a computer system that displays any of the graphical interfaces disclosed herein, the computer system can receive one or more inputs corresponding to an interaction with a graphical interface. The input(s) can be processed to determine the interaction(s) to the graphical interface.

The network analytic system may provide a graphical interface that enables a user to configure one or more parameters for tracking relationships between network assets. The parameters may include and/or define one or more attributes (e.g., "trackers") for tracking network assets. In at least one embodiment, the graphical interface can receive a query defining parameters for tracking network assets. Based on input through the graphical interface, query may be executed as part of a discovery and inventory system 136 of FIG. 1.

Figure 3:
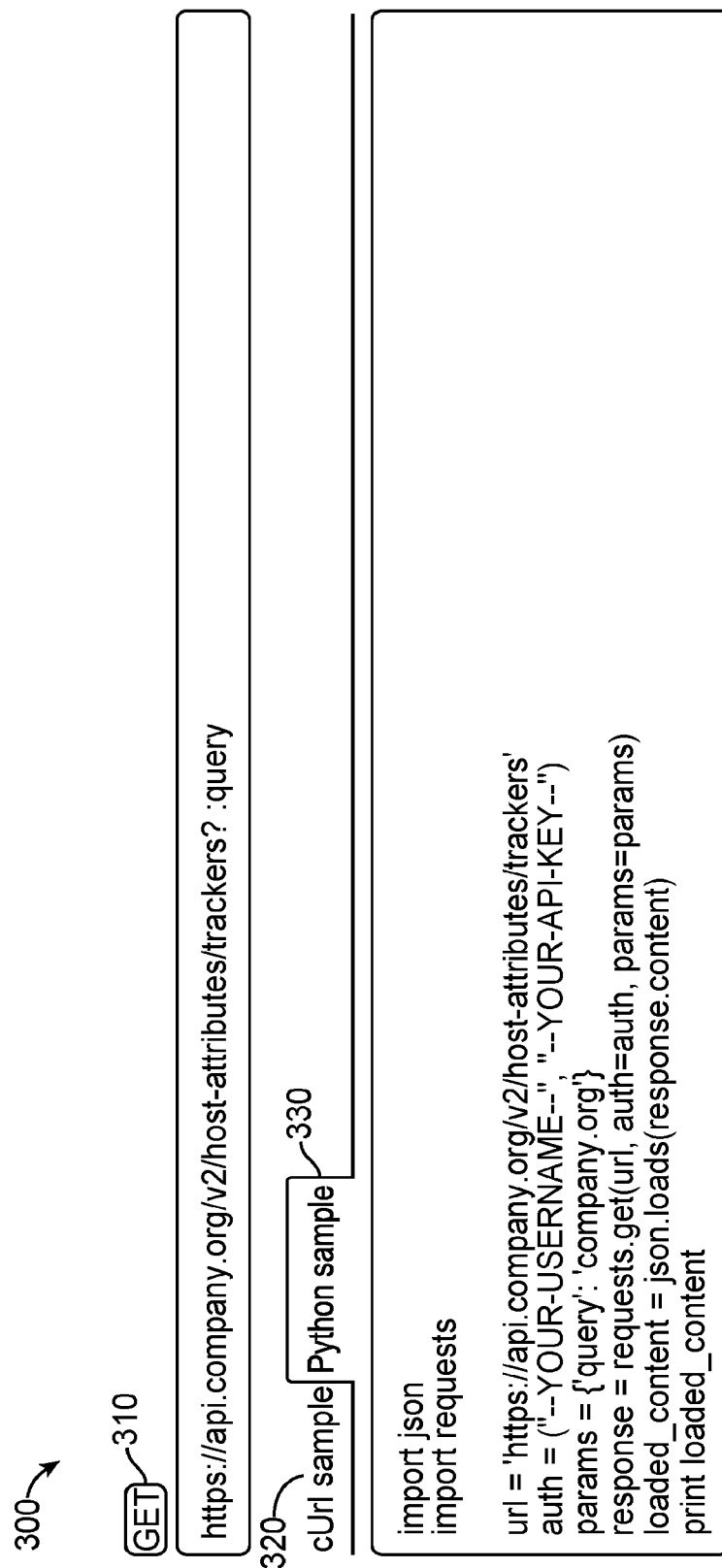

FIG. 3 illustrates a graphical interface 300 that is interactive to enable a user to provide parameters for tracking network assets. In at least one embodiment, graphical interface 300 may receive input to configure one or more parameters of a programming interface to initiate a query for tracking network assets. Graphical interface 300 includes an element 310 that is interactive to initiate a query for tracking assets. Graphical interface 300 may include one or more interactive areas. Interactive area 320 ("cURL Sample") may be interactive to enable a user to specify a command for querying trackers. Interactive area 330 ("Python Sample") may be interactive to enable a user to view and/or specify parameters for a query to get all trackers (e.g., attributes) for tracking. An interactive area such as interactive area 330 may implement one or more programming interface libraries, such as a Python library, to specify parameters for automating discovery of tracked assets. The library may include program code, such as a script, that can query values for different attributes of trackers.

FIG. 4 illustrates a graphical interface 400 of tracking information displayed based on network analytic system 120 identifying one or more assets identified based on querying for one or more attributes for tracking. In FIG. 4, an example is shown of tracking information for a query based on assets for a service provider, such as dropbox.com. The tracking information includes host information ("host"), attribute information for an attribute (e.g., an analytic identifier), value information ("value") indicating a value for each unique attribute in the attribute information, network activity information (e.g., first seen and last seen) when an attribute was detected for a network event, a suspect asset (e.g., a suspect hostname) that is utilizing or associated with the attribute, and blacklist information about whether the suspect asset was ever blacklisted. The tracking information may be useful to enable a user (e.g., a network analyst to identify a pattern, if any, and/or assets that may be identified as potentially malicious based on an attribute that is associated an asset of an entity that is tracking its assets. In this example, the datasets generated based on tracking may be useful to identify all tracking codes associated with "dropbox.com" can be identified based on having the same value for a Google® analytics account number. The Google analytics account number may be used to identify all assets which are discovered as having the persistent information stored in documents of those assets. The account number may be used to find all other properties that do not match that hostname and how it relates to the original query.

Figure 5:
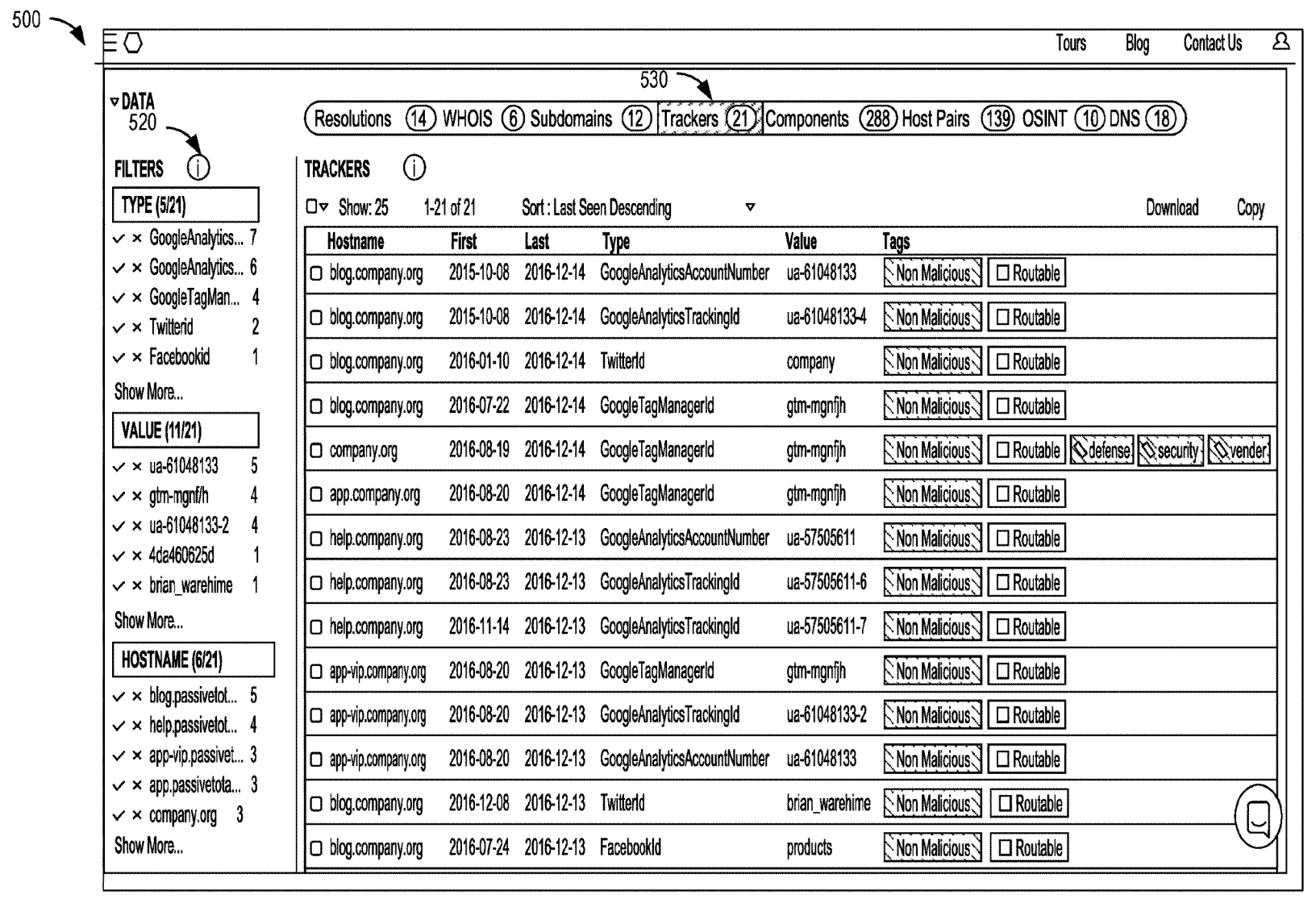

FIG. 5 illustrates a graphical interface 500 that may display network data. Graphical interface 500 may include or may be shown based on data for a heat map interface. Graphical interface 500 may include a data record interface 530 to display information about network data in data records (e.g., data sets) corresponding to the network data displayed in another graphical interface, such as an interface that shows a heat map. Interaction with a tile in the graphical interface displaying a heat map may cause the data records displayed in interface 530 to change or be modified, or vice versa. In some embodiments, a tile can be generated to have an appearance of one or more attributes that further indicate information about network activity for network data corresponding to the tile. A tile can be displayed with an appearance such as different colors and/or indicators (e.g., a diagonal line in a corner) that have different meaning about the network activity. The appearance provides further instant indication about network activity. Graphical interface 500 may be configured such that the information and/or appearance of tiles can be adjusted based on particular attributes of network activity useful to a user.

In the example of FIG. 5, interface 530 shows data records ("trackers") about network activity related to tracked identification information. The identification information may correspond to a tracking identifier such as a Google Analytics identifier. The data records may correspond to tracked hosts in the network data. Each of the data records in interface 530 may show network data for host systems that are tracked for network activity in the network data for the interface 510. Each data record may be generated based on network data for that an asset associated with an attribute. Data records interface 530 may display attributes about host systems that are tracked based on one or more types of IDs (e.g., Google Analytics ID or Twitter ID).

Interface 530 shows an example of tracker network data determined for the network data displayed in a heat map interface. Each of the data records may be presented with a visual appearance to indicate statistical information or other information about network activity related to those records. Interface 520 may be a filter interface to selectively filter the data records shown in interface 530. The filters may be presented based on each of the different attributes associated with the network data. For example, in FIG. 5, each data record for a tracked host system may indicate a hostname, a first seen date, a last seen date, a type of ID, a value, a tag, etc. The filters may correspond to the values for each of the attributes. Selecting or unselecting one or more values for attributes can limit the data records shown. In some embodiments, a heat map interface may be updated to display network data based on the filtered records about tracked host systems.

Figure 6:
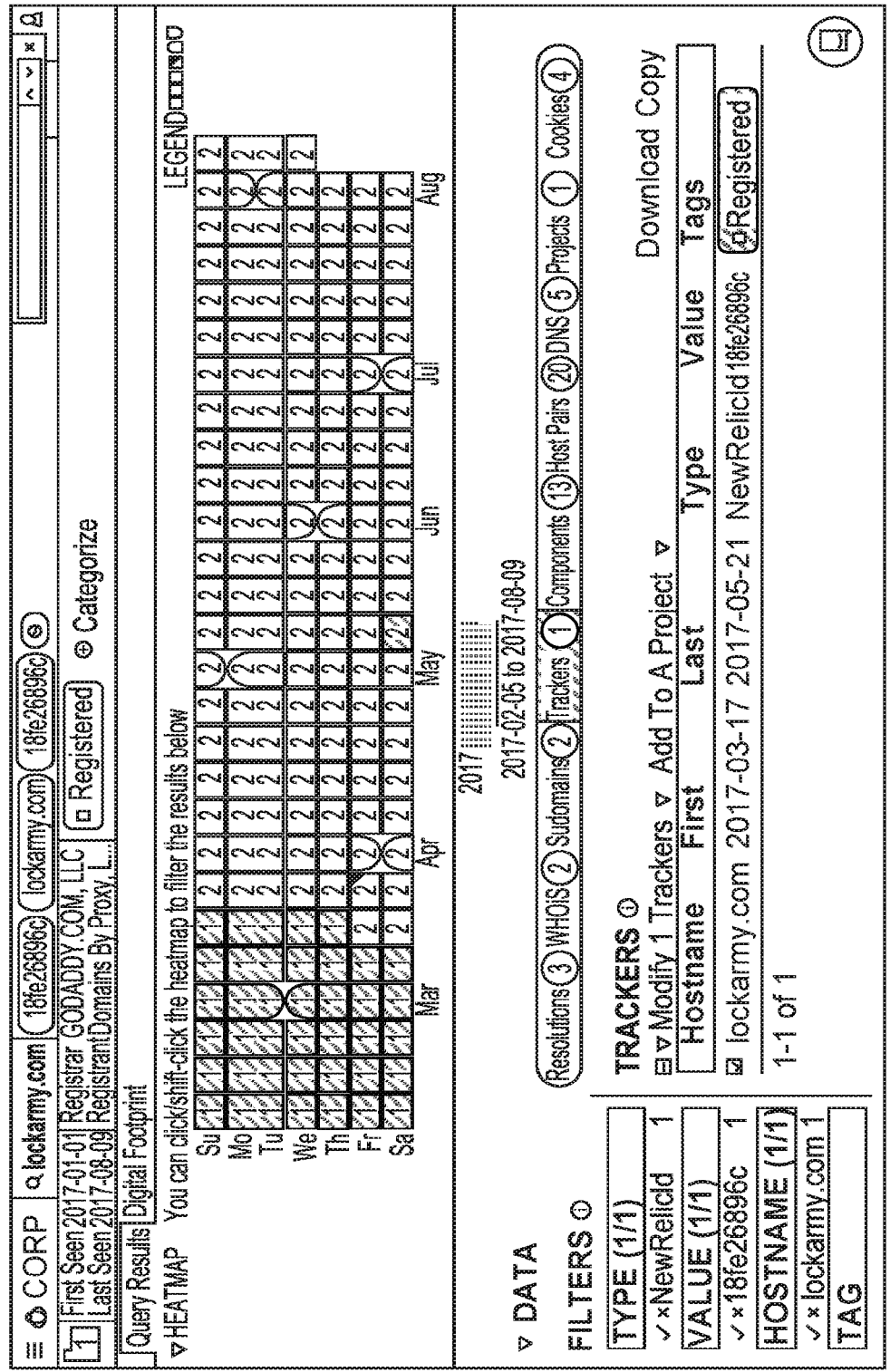

FIG. 6 illustrates a graphical interface 600 that shows network data according to a time period for assessing a domain. Specifically, graphical interface 600 shows a heat map interface of network data for a time period with respect to a domain provided by a user. Graphical interface 600 includes a data record interface for showing tracking information with respect to a particular type of track (e.g., attribute), such as an identifier (e.g., NewRelicid) of a system that provides identifiers upon registration with the system for a service. In this example, the data record interface shows an instance of an identifier for a type of attribute discovered in network data for the domain during the time period. The data record interface may provide a record for each unique instance that an attribute is detected in network data, and if multiple occurrences, tracking information as to when detected, such as first seen and last seen. Interaction with one or more records in the data record interface may cause the graphical interface to be modified or updated to reflect the network data corresponding to the selected records. For example, a heat map interface may be updated to show or highlight the data corresponding to the occurrence of the event related to the tracker(s) for the selected records.

Figure 7:
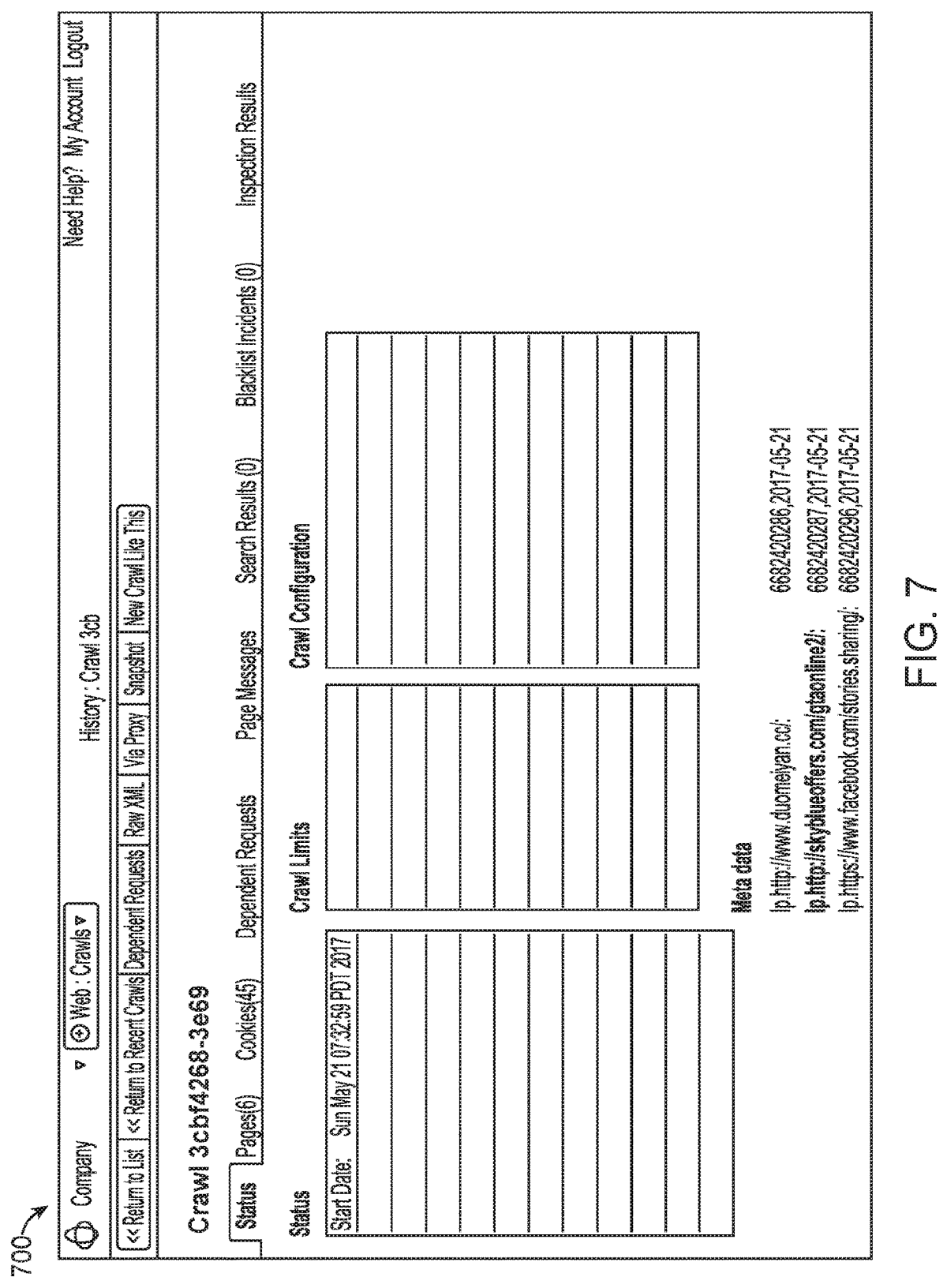

FIG. 7 illustrates a graphical interface 700 for displaying crawl information for one or more crawls performed for tracking based on one or more attributes. As discussed above, a crawl may be performed by discovery and inventory system 136. As part of the crawl, each of the web pages crawled for any domain may be processed including page messages, cookies, and dependent requests identified within a web page. For each web page, metadata may be identified and extracted including a value of an attribute (e.g., analytics ID) defined for a tracker. Graphical interface 700 may include one or more interactive display areas such as the status, metadata on pages, and data obtained from the web pages including information about the web pages, cookies, dependent requests, and page messages. The status may include a time period, crawl limits, and crawl configuration as well as metadata identified in one or more documents.

FIG. 8 illustrates a graphical interface 800 for displaying crawl information for one or more documents (e.g., web pages) discovered during a crawl by discovery and inventory system, 136. Graphical interface 800 may be displayed with one or more interactive display areas for each crawl, including a status of craws, documents (e.g., web pages) processed, and content identified for the documents. The content may include cookies, dependent requests, page messages, and inspection results about the documents. As shown in FIG. 8 dependent requests may include a URL for each request, a response code, content type, content length, dependent requests, and cookies. The information about documents may be used to determine whether a network-based asset including the documents for the asset are to be tracked on the basis of the information with respect to documents that satisfy the criteria for tracking. Graphical interface 900 of FIG. 9 illustrates a display of status with respect to the status related accessing a particular document shown in graphical interface 800.

FIGS. 10A-10D illustrate a graphical interface 1000 displaying a DOM object for a document according to some embodiments. Graphical interface 1000 may be interactive to display a DOM object including metadata for a document corresponding to an asset identified in a previous graphical interface. In the example of FIGS. 10A-10D, the DOM object is shown with metadata for a document. The metadata may include an identifier of a service provider, one or more links to scripts, and other resources. The metadata for a document may be parsed from the DOM object to determine whether the metadata includes information that satisfies the criteria (e.g., an attribute) provided by a user. FIGS. 10E-10G illustrate a graphical interface 1050 displaying a response body for a request (e.g., dependent request) for a resource (e.g., program code script). Graphical interface 1050 may be displayed concurrently with or in the same graphical interface as graphical interface 1000. The response may be parsed to identify information that satisfies the criteria for tracking assets.

Figure 11:
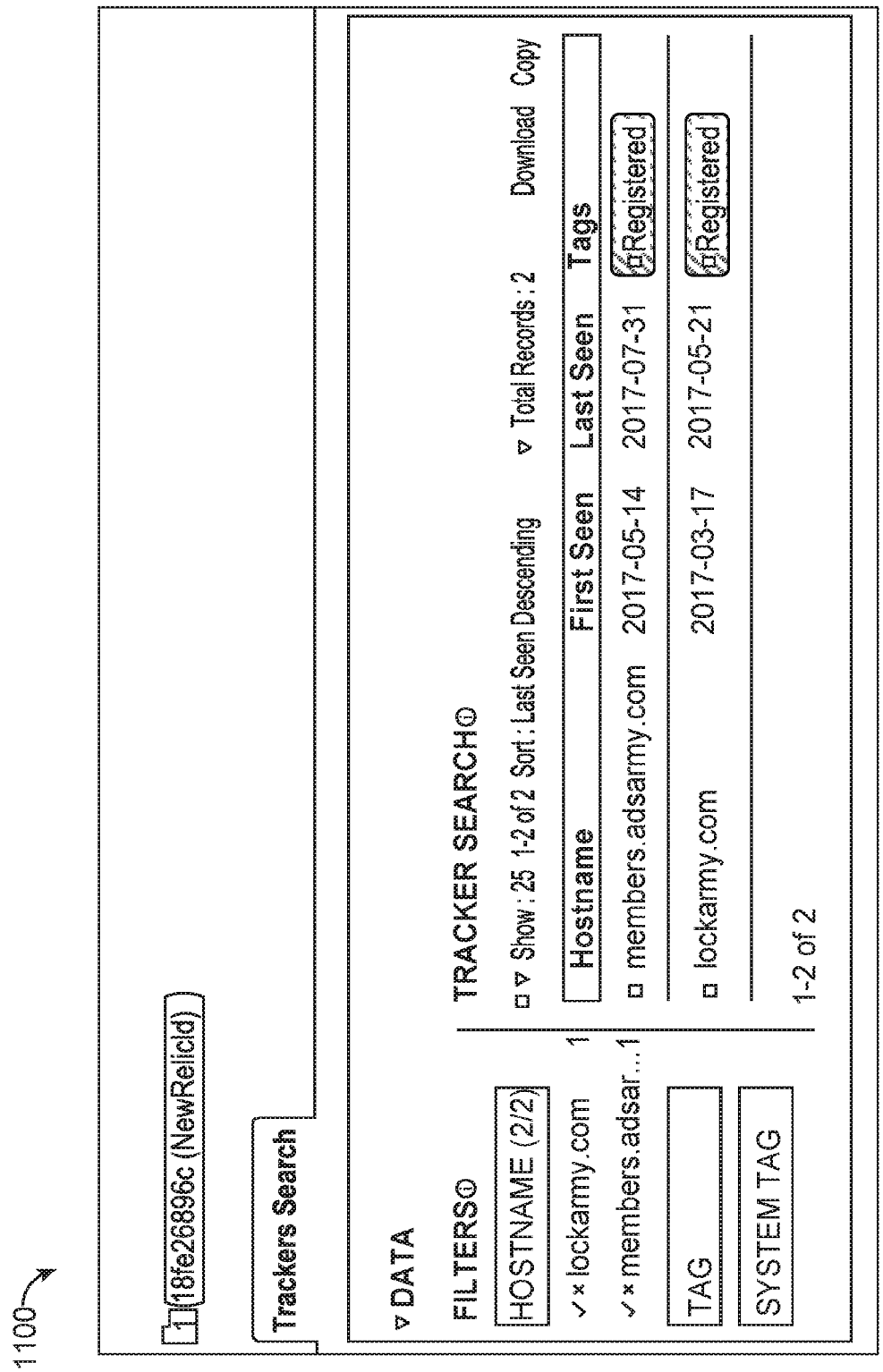

FIG. 11 illustrates a graphical interface 1100 displaying records about network-based assets identified based on criteria, such as an analytics identifier of a service provider. Specifically, graphical interface 1100 displays information in network data for network-based assets identified based on having an attribute (e.g., identifier of a service provider). This display may enable a user to identify network-based assets that are related to malicious activity on the basis of identifying on asset using attribute information. Each record may be interactive to display the network data for the network-based asset according to a time period on a heat map.

IV. Computer Systems for Network Analytic System and Client System

Figure 12:
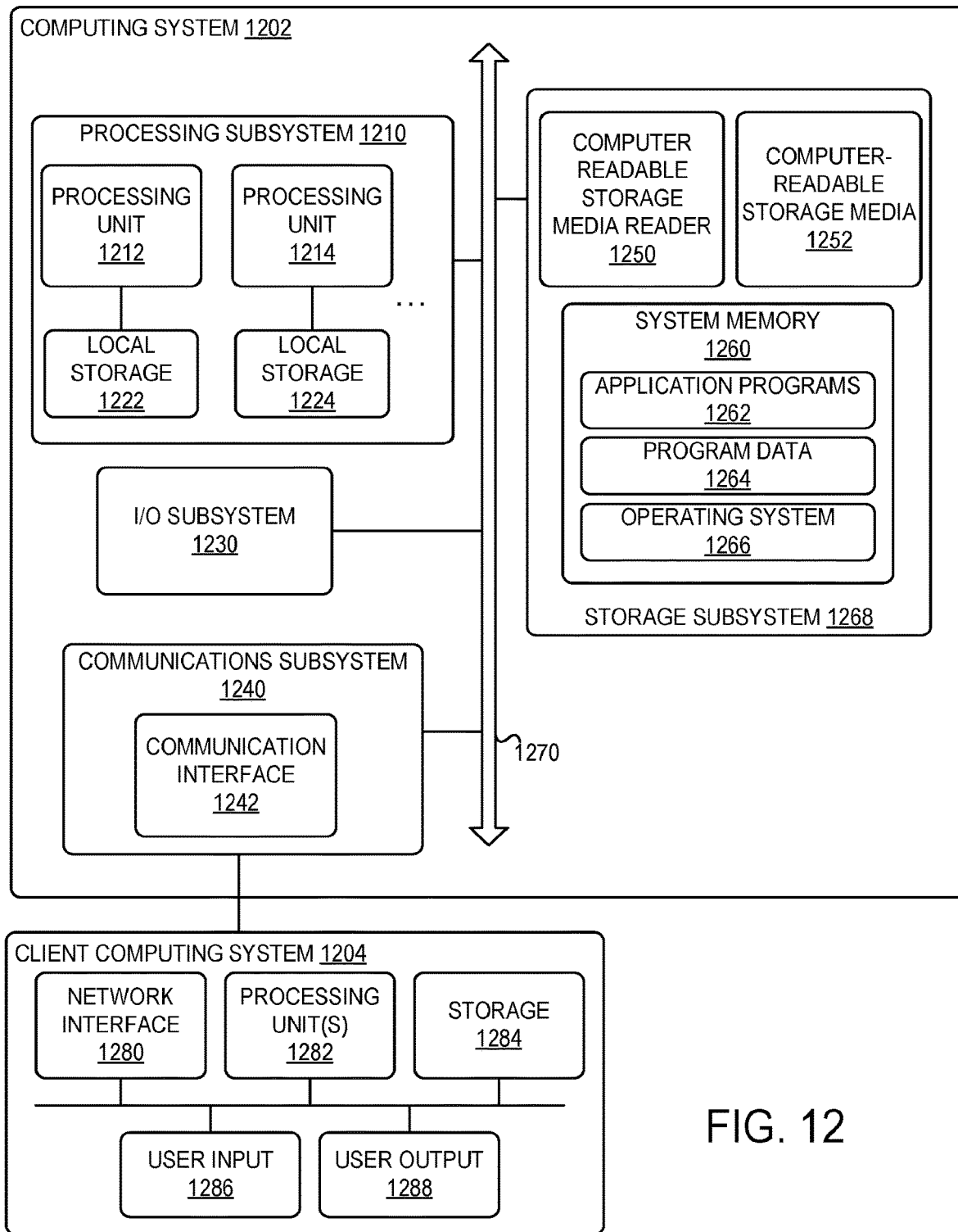
FIG. 12 shows a simplified block diagram of a computing system and a client computing system usable to implement some embodiments.

Various operations disclosed herein may be implemented on computer systems, which may be of generally conventional design. FIG. 12 shows a simplified block diagram of a representative computing system 1202 and client computing system 1204 usable to implement certain embodiments of the present disclosure. In various embodiments, computing system 1202 or similar systems may implement network analytic system 120, or any other computing system disclosed herein or portions thereof. Client computing system 1204 or similar systems may implement client system 104, or other client systems disclosed herein.

Computing system 1202 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 1202 may include processing subsystem 1210. Processing subsystem 1210 may communicate with a number of peripheral systems via bus subsystem 1270. These peripheral systems may include I/O subsystem 1230, storage subsystem 1268, and communications subsystem 1240.

Bus subsystem 1270 provides a mechanism for letting the various components and subsystems of server computing system 1204 communicate with each other as intended. Although bus subsystem 1270 is shown schematically as a single bus, alternative embodiments of the bus subsystem may utilize multiple buses. Bus subsystem 1270 may form a local area network that supports communication in processing subsystem 1210 and other components of server computing system 1220. Bus subsystem 1270 may be implemented using various technologies including server racks, hubs, routers, etc. Bus subsystem 1270 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 1230 may include devices and mechanisms for inputting information to computing system 1202 and/or for outputting information from or via computing system 1202. In general, use of the term "input device" is intended to include all possible types of devices and mechanisms for inputting information to computing system 1202. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 1202 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 1210 controls the operation of computing system 1202 and may comprise one or more processing units 1212, 1214, etc. A processing unit may include one or more processors, including single core processor or multicore processors, one or more cores of processors, or combinations thereof. In some embodiments, processing subsystem 1210 may include one or more special purpose co-processors such as graphics processors, digital signal processors (DSPs), or the like. In some embodiments, some or all of the processing units of processing subsystem 1210 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 1222, 1224. Any type of processors in any combination may be included in processing unit(s) 1212, 1214.

In some embodiments, processing subsystem 1210 may be implemented in a modular design that incorporates any number of modules (e.g., blades in a blade server implementation). Each module may include processing unit(s) and local storage. For example, processing subsystem 1210 may include processing unit 1212 and corresponding local storage 1222, and processing unit 1214 and corresponding local storage 1224.

Local storage 1222, 1224 may include volatile storage media (e.g., conventional DRAM, SRAM, SDRAM, or the like) and/or non-volatile storage media (e.g., magnetic or optical disk, flash memory, or the like). Storage media incorporated in local storage 1222, 1224 may be fixed, removable or upgradeable as desired. Local storage 1222, 1224 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 1212, 1214 need at runtime. The ROM may store static data and instructions that are needed by processing unit(s) 1212, 1214. The permanent storage device may be a non-volatile read-and-write memory device that may store instructions and data even when a module including one or more processing units 1212, 1214 and local storage 1222, 1224 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 1222, 1224 may store one or more software programs to be executed by processing unit(s) 1212, 1214, such as an operating system and/or programs implementing various server functions such as functions of network analytic system 120, or any other server(s) associated with network analytic system 120. "Software" refers generally to sequences of instructions that, when executed by processing unit(s) 1212, 1214 cause computing system 1202 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 1212, 1214. In some embodiments the instructions may be stored by storage subsystem 1268 (e.g., computer readable storage media). In various embodiments, the processing units may execute a variety of programs or code instructions and may maintain multiple concurrently executing programs or processes. At any given time, some or all of the program code to be executed may be resident in local storage 1222, 1224 and/or in storage subsystem including potentially on one or more storage devices. Software may be implemented as a single program or a collection of separate programs or program modules that interact as desired. From local storage 1222, 1224 (or non-local storage described below), processing unit(s) 1212, 1214 may retrieve program instructions to execute and data to process in order to execute various operations described above.

Storage subsystem 1268 provides a repository or data store for storing information that is used by computing system 1202. Storage subsystem 1268 provides a tangible non-transitory computer-readable storage medium for storing the basic programming and data constructs that provide the functionality of some embodiments. Software (programs, code modules, instructions) that when executed by processing subsystem 1210 provide the functionality described above may be stored in storage subsystem 1268. The software may be executed by one or more processing units of processing subsystem 1210. Storage subsystem 1268 may also provide a repository for storing data used in accordance with the present disclosure.

Storage subsystem 1268 may include one or more non-transitory memory devices, including volatile and non-volatile memory devices. As shown in FIG. 12, storage subsystem 1268 includes a system memory 1260 and a computer-readable storage media 1252. System memory 1260 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 1202, such as during start-up, may typically be stored in the ROM. The RAM typically contains data and/or program modules that are presently being operated and executed by processing subsystem 1210. In some implementations, system memory 1260 may include multiple different types of memory, such as static random access memory (SRAM) or dynamic random access memory (DRAM). Storage subsystem 1268 may be based on magnetic, optical, semiconductor, or other data storage media. Direct attached storage, storage area networks, network-attached storage, and the like may be used. Any data stores or other collections of data disclosed herein as being produced, consumed, or maintained by a service or server may be stored in storage subsystem 1268.

By way of example, and not limitation, as depicted in FIG. 12, system memory 1260 may store application programs 1262, which may include client applications, Web browsers, mid-tier applications, relational database management systems (RDBMS), etc., program data 1264, and one or more operating systems 1266. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1252 may store programming and data constructs that provide the functionality of some embodiments. Software (programs, code modules, instructions) that when executed by processing subsystem 1210 a processor provide the functionality described above may be stored in storage subsystem 1268. By way of example, computer-readable storage media 1252 may include non-volatile memory such as a hard disk drive, a magnetic disk drive, an optical disk drive such as a CD ROM, DVD, a Blu-Ray® disk, or other optical media. Computer-readable storage media 1252 may include, but is not limited to, Zip® drives, flash memory cards, universal serial bus (USB) flash drives, secure digital (SD) cards, DVD disks, digital video tape, and the like. Computer-readable storage media 1252 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1252 may provide storage of computer-readable instructions, data structures, program modules, and other data for computing system 1202.

In certain embodiments, storage subsystem 1268 may also include a computer-readable storage media reader 1250 that may further be connected to computer-readable storage media 1252. Together and, optionally, in combination with system memory 1260, computer-readable storage media 1252 may comprehensively represent remote, local, fixed, and/or removable storage devices plus storage media for storing computer-readable information.

In certain embodiments, computing system 1202 may provide support for executing one or more virtual machines. Computing system 1202 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 1202. Accordingly, multiple operating systems may potentially be run concurrently by computing system 1202. Each virtual machine generally runs independently of the other virtual machines.

Communication subsystem 1240 provides an interface to other computer systems and networks. Communication subsystem 1240 serves as an interface for receiving data from and transmitting data to other systems from computing system 1202. For example, communication subsystem 1240 may enable computing system 1202 to establish a communication channel to one or more client computing devices via the Internet for receiving and sending information from and to the client computing devices.

Communication subsystem 1240 may support both wired and/or wireless communication protocols. For example, in certain embodiments, communication subsystem 1240 may include radio frequency (RF) transceiver components for accessing wireless voice and/or data networks (e.g., using cellular telephone technology, advanced data network technology, such as 3G, 4G, or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 1240 may provide wired network connectivity (e.g., Ethernet) in addition to or instead of a wireless interface.

Communication subsystem 1240 may receive and transmit data in various forms. For example, in some embodiments, communication subsystem 1240 may receive input communication in the form of structured and/or unstructured data feeds, event streams, event updates, and the like. For example, communication subsystem 1240 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 1240 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 1240 may also be configured to output the structured and/or unstructured data feeds, event streams, event updates, and the like to one or more databases that may be in communication with one or more streaming data source computers coupled to computing system 1202.

Communication subsystem 1240 may provide a communication interface 1242, e.g., a WAN interface, which may provide data communication capability between the local area network (bus subsystem 1270) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 1202 may operate in response to requests received via communication interface 1242. Further, in some embodiments, communication interface 1242 may connect computing systems 1202 to each other, providing scalable systems capable of managing high volumes of activity. Conventional or other techniques for managing server systems and server farms (collections of server systems that cooperate) may be used, including dynamic resource allocation and reallocation.

Computing system 1202 may interact with various user-owned or user-operated devices via a wide-area network such as the Internet. An example of a user-operated device is shown in FIG. 12 as client computing system 1202. Client computing system 1204 may be implemented, for example, as a consumer device such as a smart phone, other mobile phone, tablet computer, wearable computing device (e.g., smart watch, eyeglasses), desktop computer, laptop computer, and so on.

For example, client computing system 1204 may communicate with computing system 1202 via communication interface 1242. Client computing system 1204 may include conventional computer components such as processing unit(s) 1282, storage device 1284, network interface 1280, user input device 1286, and user output device 1288. Client computing system 1204 may be a computing device implemented in a variety of form factors, such as a desktop computer, laptop computer, tablet computer, smart phone, other mobile computing device, wearable computing device, or the like.

Processing unit(s) 1282 and storage device 1284 may be similar to processing unit(s) 1212, 1214 and local storage 1222, 1224 described above. Suitable devices may be selected based on the demands to be placed on client computing system 1204; for example, client computing system 1204 may be implemented as a "thin" client with limited processing capability or as a high-powered computing device. Client computing system 1204 may be provisioned with program code executable by processing unit(s) 1282 to enable various interactions with computing system 1202 of a message management service such as accessing messages, performing actions on messages, and other interactions described above. Some client computing systems 1204 may also interact with a messaging service independently of the message management service.

Network interface 1280 may provide a connection to a wide area network (e.g., the Internet) to which communication interface 1240 of computing system 1202 is also connected. In various embodiments, network interface 1280 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 1286 may include any device (or devices) via which a user may provide signals to client computing system 1204; client computing system 1204 may interpret the signals as indicative of particular user requests or information. In various embodiments, user input device 1286 may include any or all of a keyboard, touch pad, touch screen, mouse or other pointing device, scroll wheel, click wheel, dial, button, switch, keypad, microphone, and so on.

User output device 1288 may include any device via which client computing system 1204 may provide information to a user. For example, user output device 1288 may include a display to display images generated by or delivered to client computing system 1204. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 1288 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1212, 1214 and 1282 may provide various functionality for computing system 1202 and client computing system 1204, including any of the functionality disclosed herein as being performed by a server or client, or other functionality associated with message management services.

It will be appreciated that computing system 1202 and client computing system 1204 are illustrative and that variations and modifications are possible. Computer systems used in connection with embodiments of the present disclosure may have other capabilities not specifically described here. Further, while computing system 1202 and client computing system 1204 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While the present disclosure has been described with respect to specific embodiments, one skilled in the art will recognize that numerous modifications are possible. For instance, although specific processes are disclosed herein, other processes may be implemented. Embodiments of the present disclosure may be realized using a variety of computer systems and communication technologies including but not limited to specific examples disclosed herein.

Embodiments of the present disclosure may be realized using any combination of dedicated components and/or programmable processors and/or other programmable devices. The various processes disclosed herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the present disclosure has been described with respect to specific embodiments, it will be appreciated that the present disclosure is intended to cover all modifications and equivalents within the scope of the following claims.

What is claimed is:

1. A computer-implemented method comprising, at a computer system:
   accepting a crawl configuration, which specifies a sequence of internet-facing assets to be monitored, based on verification that the crawl configuration is free of errors;
   selecting a proxy server via which to access an internet-facing asset, which is included in the sequence of internet-facing assets, based on the crawl configuration, the proxy server enabling a bot to anonymously interact with the internet-facing asset;
   selecting the bot, which obtains data from the internet-facing asset by accessing the internet-facing asset anonymously via the proxy server, based on the crawl configuration;
   monitoring the internet-facing asset according to the crawl configuration, wherein the monitoring comprises identifying an event that is indicated by the data, which is obtained by the bot, by analyzing the data;
   based on the event being identified, causing data related to the event to be displayed on a display device;
   analyzing network data associated with the event; and
   causing information related to the network data to be displayed on the display device.

2. The computer-implemented method of claim 1, wherein accepting the crawl configuration comprises:
   accepting the crawl configuration based on verification that the crawl configuration includes requisite username and password information.

3. The computer-implemented method of claim 1, wherein the crawl configuration indicates an order in which the internet-facing assets are to be monitored, the order based on how close links to the internet-facing assets are to a root directory of a web page.

4. The computer-implemented method of claim 1, wherein the proxy server simulates access of the internet-facing asset by devices from different geographic locations.

5. The computer-implemented method of claim 1, wherein the proxy server simulates access of the internet-facing asset by different types of web browsers.

6. The computer-implemented method of claim 1, wherein selecting the proxy server comprises:
   selecting the proxy server from a plurality of proxy servers based on the crawl configuration, which specifies the sequence of the internet-facing assets to be monitored.

7. The computer-implemented method of claim 1, wherein selecting the bot comprises:
   selecting the bot from a plurality of bots based on the crawl configuration, which specifies the sequence of the internet-facing assets to be monitored.

8. The computer-implemented method of claim 1, wherein monitoring the internet-facing asset comprises:
   monitoring the internet-facing asset according to a rule that is defined based on a user-specified keyword.

9. The computer-implemented method of claim 1, wherein analyzing the network data comprises:
   analyzing the network data, which indicates Internet activity associated with the event.

10. A system comprising:
    memory; and
    a processing system coupled to the memory, the processing system configured to:
      select a proxy server via which to access an internet-facing asset based on a crawl configuration that indicates an order in which a plurality of internet-facing assets, which includes the internet-facing asset, are to be monitored, the order based on how close a plurality of respective links to the plurality of internet-facing assets are to a root directory of a web page, the proxy server enabling a bot to anonymously interact with the internet-facing asset;
      based on the crawl configuration, select the bot, which obtains data from the internet-facing asset by accessing the internet-facing asset anonymously via the proxy server;
      monitor the internet-facing asset according to the crawl configuration, wherein the monitoring comprises identifying an event that is indicated by the data, which is obtained by the bot, by analyzing the data;
      based on the event being identified, cause data related to the event to be displayed on a display device;
      analyze network data associated with the event; and
      cause information related to the network data to be displayed on the display device.

11. The system of claim 10, wherein the processing system is further configured to: accept the crawl configuration based on verification that the crawl configuration is free of errors.

12. The system of claim 11, wherein the processing system is configured to:
    accept the crawl configuration based on verification that the crawl configuration includes requisite username and password information.

13. The system of claim 10, wherein the proxy server simulates access of the internet-facing asset by devices from different geographic locations.

14. The system of claim 10, wherein the proxy server simulates access of the internet-facing asset by different types of web browsers.

15. The system of claim 10, wherein the processing system is configured to:
    select the proxy server from a plurality of proxy servers based on the crawl configuration, which indicates the order in which the plurality of internet-facing assets are to be monitored.

16. The system of claim 10, wherein the processing system is configured to:
    select the bot from a plurality of bots based on the crawl configuration, which indicates the order in which the plurality of internet-facing assets are to be monitored.

17. The system of claim 10, wherein the processing system is configured to:
    monitor the internet-facing asset according to a rule that is defined based on a user-specified keyword.

18. The system of claim 10, wherein the processing system is configured to:
    analyze the network data, which indicates Internet activity associated with the event.

19. A non-transitory computer-readable storage medium storing instructions that, when executed, cause a processor-based system to perform operations, the operations comprising:
- accept a crawl configuration, which specifies a sequence of internet-facing assets to be monitored, based on verification that the crawl configuration is free of errors;
- select a proxy server via which to access an internet-facing asset, which is included in the sequence of internet-facing assets, based on the crawl configuration, the proxy server enabling a bot to anonymously interact with the internet-facing asset;
- select the bot, which is configured to obtain data from the internet-facing asset by accessing the internet-facing asset anonymously via the proxy server, based on the crawl configuration;
- monitor the internet-facing asset according to the crawl configuration, wherein the monitoring comprises identifying an event that is indicated by the data, which is obtained by the bot, by analyzing the data;
- based on the event being identified, cause data related to the event to be displayed on a display device;
- analyze network data associated with the event; and
- cause information related to the network data to be displayed on the display device.

20. The non-transitory computer-readable storage medium of claim 19, wherein the crawl configuration indicates an order in which the internet-facing assets are to be monitored, the order based on how close links to the internet-facing assets are to a root directory of a web page.

* * * * *